United States Patent [19]

Bacchi et al.

[11] Patent Number: 5,765,444
[45] Date of Patent: Jun. 16, 1998

[54] DUAL END EFFECTOR, MULTIPLE LINK ROBOT ARM SYSTEM WITH CORNER REACHAROUND AND EXTENDED REACH CAPABILITIES

[75] Inventors: Paul Bacchi, Novato; Paul S. Filipski, Greenbrae, both of Calif.

[73] Assignee: Kensington Laboratories, Inc., Richmond, Calif.

[21] Appl. No.: 500,489

[22] Filed: Jul. 10, 1995

[51] Int. Cl.⁶ ............................................. G05G 11/00
[52] U.S. Cl. ........................... 74/490.03; 414/744.5; 901/40
[58] Field of Search ............. 414/744.5; 901/8, 901/15, 40; 74/490.03, 490.01, 490.05

[56] References Cited

U.S. PATENT DOCUMENTS

| | | | |
|---|---|---|---|
| 4,065,001 | 12/1977 | Ohnaka | 901/40 |
| 4,299,533 | 11/1981 | Ohnaka | 901/40 |
| 4,457,664 | 7/1984 | Judell et al. | 414/779 |
| 4,728,252 | 3/1988 | Lada et al. | 414/744 |
| 4,897,015 | 1/1990 | Abbe et al. | 414/744.8 |
| 4,938,654 | 7/1990 | Schram | 198/394 X |
| 5,007,784 | 4/1991 | Genov et al. | 414/225 |
| 5,046,992 | 9/1991 | Tamai et al. | 474/84 |
| 5,054,991 | 10/1991 | Kato | 414/783 |
| 5,064,340 | 11/1991 | Genov et al. | 414/744.5 |
| 5,083,896 | 1/1992 | Uehara et al. | 414/744.5 |
| 5,102,280 | 4/1992 | Poduje et al. | 414/225 |
| 5,125,791 | 6/1992 | Volovich | 198/394 X |
| 5,151,008 | 9/1992 | Ishida et al. | 414/744.5 |
| 5,178,512 | 1/1993 | Skrobak | 414/744.5 |
| 5,308,222 | 5/1994 | Bacchi et al. | 414/783 |
| 5,314,294 | 5/1994 | Taniguchi et al. | 414/744.5 |
| 5,331,458 | 7/1994 | Bacchi et al. | 359/393 |
| 5,332,352 | 7/1994 | Poduje et al. | 414/225 |
| 5,382,806 | 1/1995 | Bacchi et al. | 250/561 |
| 5,513,946 | 5/1996 | Sawada et al. | 414/744.5 |
| 5,584,647 | 12/1996 | Uehara et al. | 414/744.5 |

FOREIGN PATENT DOCUMENTS

| | | | |
|---|---|---|---|
| 0065859 | 1/1982 | European Pat. Off. | B25J 9/00 |
| 9104138 | 4/1991 | WIPO | B25J 9/06 |

OTHER PUBLICATIONS

Kensington Laboratories, Inc., Product Advertisement Brochure, including pocket information sheet for 3 Link Wafer Handler, Jul. 20, 1993.

IBM Technical Disclosure Bulletin, vol. 31, No. 10, Mar. 1989, "Dual Microscope Semiconductor Wafer Inspection Station".

Primary Examiner—Charles A. Marmor
Assistant Examiner—David M. Fenstermacher
Attorney, Agent, or Firm—Stoel Rives LLP

[57] ABSTRACT

A multiple link robot arm system has straight line motion, extended reach, corner reacharound, and continuous bidirectional rotation capabilities for transporting specimens to virtually any location in an available work space that is free of lockout spaces. Each of two embodiments includes two end effectors or hands. A first embodiment comprises two multiple link robot arm mechanisms mounted on a torso link that is capable of 360 degree rotation about a central axis. Each robot arm mechanism includes an end effector having a single hand. A second embodiment has only one of the robot arm mechanisms and has an end effector with two oppositely extending hands. Each robot arm mechanism uses two motors capable of synchronized operation to permit movement of the robot arm hand along a curvilinear path as the extension of the hand changes. A third motor rotates the torso link about the central axis and permits rotation of the torso link independent of the motion of the robot arm mechanism or mechanisms mounted to it. The presence of the rotatable torso link together with the independent robot arm motion provides a high speed, high throughput robot arm system that operates in a compact work space.

17 Claims, 13 Drawing Sheets

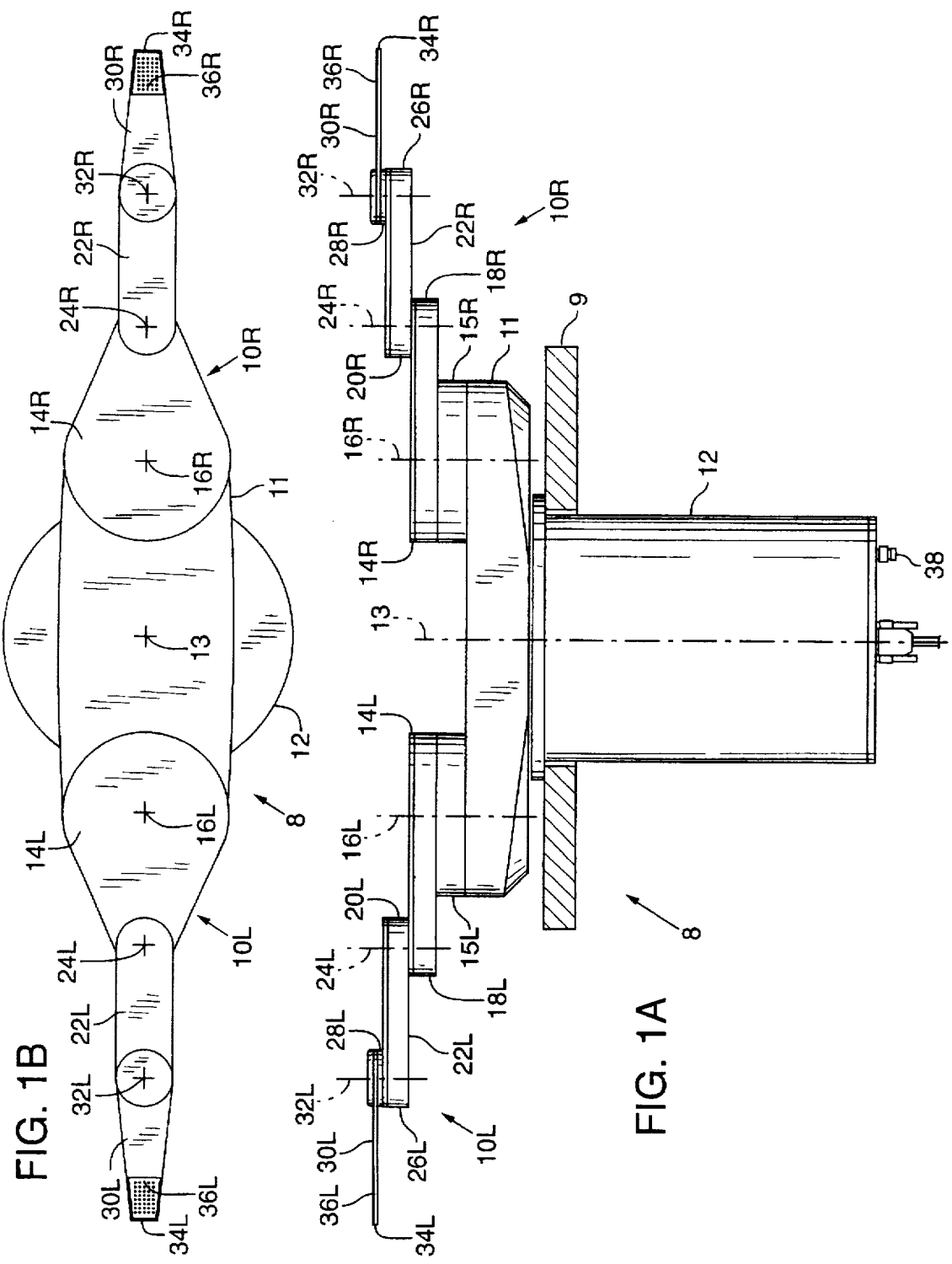

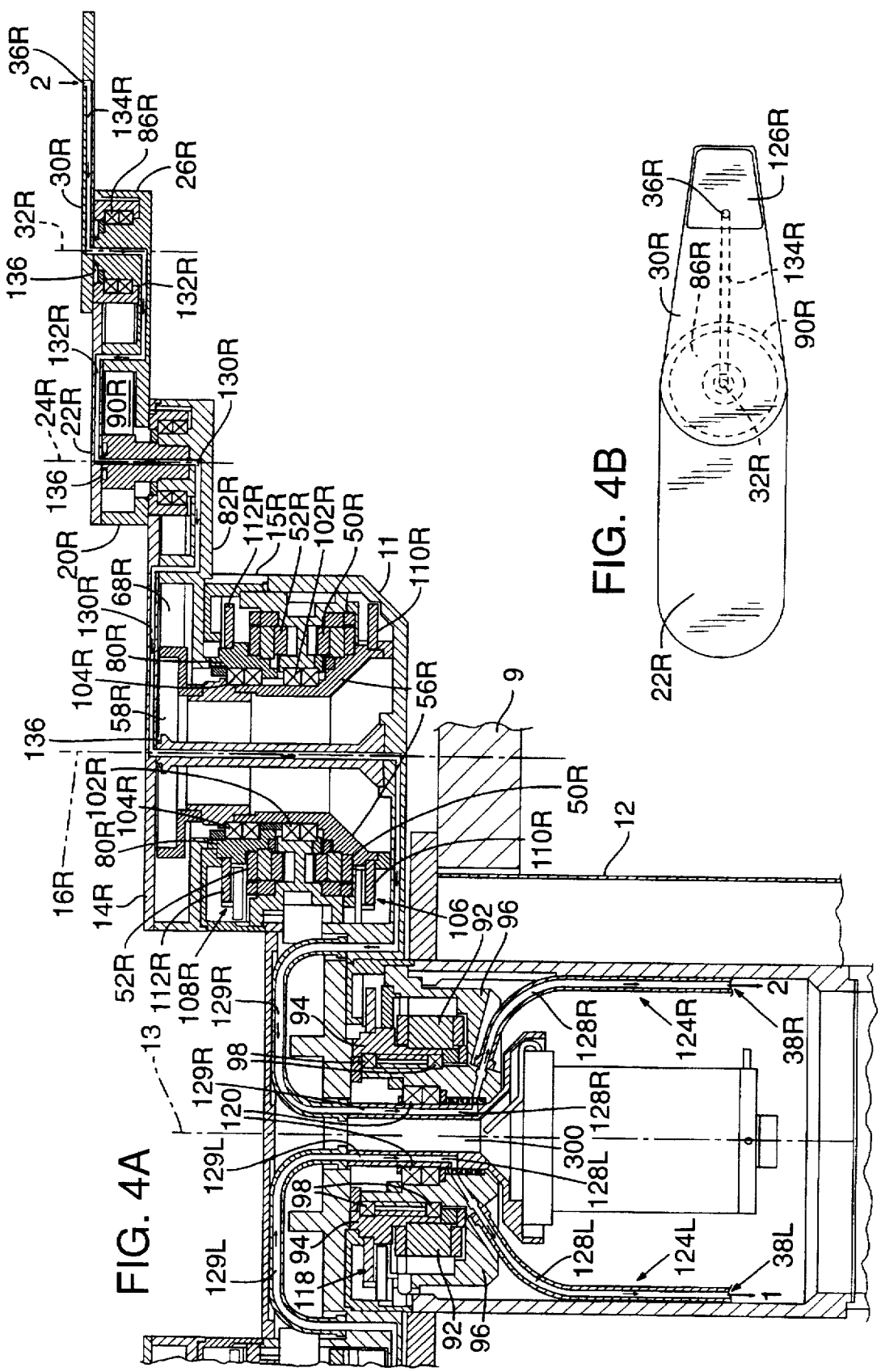

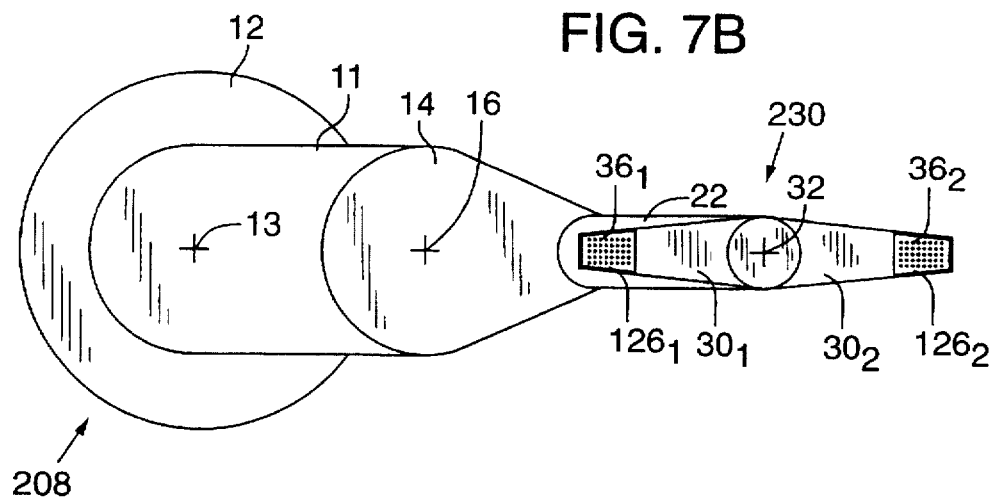
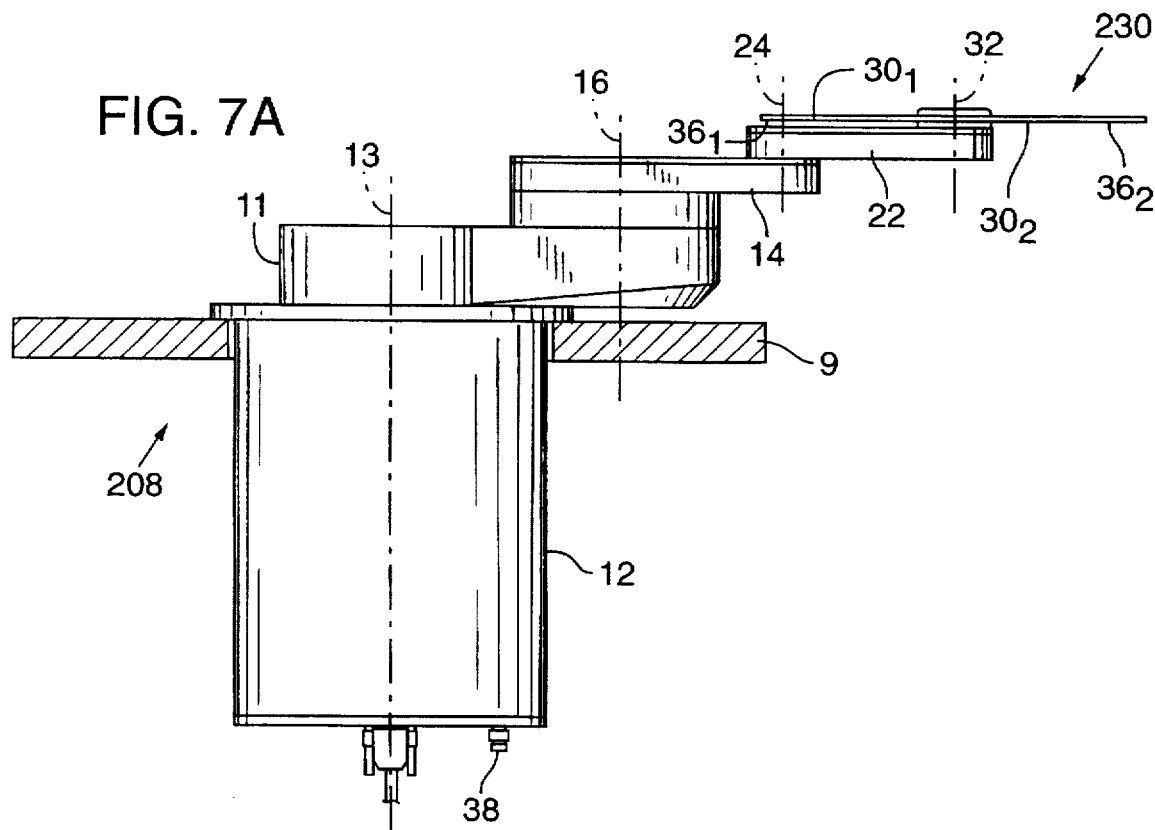

DUAL END EFFECTOR, MULTIPLE LINK ROBOT ARM SYSTEM WITH CORNER REACHAROUND AND EXTENDED REACH CAPABILITIES

TECHNICAL FIELD

The present invention relates to robot arm mechanisms and, in particular, to a continuously rotatable multiple link robot arm system with corner reacharound and extended reach capabilities.

BACKGROUND OF THE INVENTION

Currently available robot arm mechanisms include pivotally joined multiple links that are driven by a first motor and are mechanically coupled to effect straight line movement of an end effector or hand and are equipped with a second, independently operating motor to angularly displace the hand about a central axis. Certain robot arm mechanisms are equipped with telescoping mechanisms that move the hand also in a direction perpendicular to the plane of straight line movement and angular displacement of the hand. The hand is provided with a vacuum outlet that secures a specimen, such as a semiconductor wafer, computer hard disk, or compact disk, to the hand as it transports the specimen between processing stations.

U.S. Pat. No. 4,897,015 of Abbe et al. describes a rotary-to-linear motion robot arm that uses a first motor to control a multi-linkage robot arm to produce straight line radial motion from motor-driven rotary motion. An additional motor may be coupled to the robot arm for operation independent of that of the first motor to angularly move the multi-linkage robot arm without radial motion. Because they independently produce radial motion and angular motion, the first and second motors produce useful robot arm movement when either one of them is operating.

The robot arm of the Abbe et al. patent extends and retracts an end effector (or a hand) along a straight line path by means of a mechanism that pivotally couples in a fixed relationship a first arm (or forearm) and a second (or upper) arm so that they move in predetermined directions in response to rotation of the upper arm. To achieve angular displacement of the hand, a Θ drive motor rotates the entire robot arm structure. The Abbe et al. patent describes no capability of the robot arm to reach around corners or travel along any path other than a straight line or a circular segment defined by a fixed radius.

U.S. Pat. No. 5,007,784 of Genov et al. describes a robot arm with an end effector structure that has two oppositely extending hands, each of which is capable of picking up and transporting a specimen. The end effector structure has a central portion that is centrally pivotally mounted about the distal end of a second link or forearm. The extent of pivotal movement about all pivot axes is purposefully limited to prevent damage to vacuum pressure flexible conduits resulting from kinking or twisting caused by over-rotation in a single direction.

The coupling mechanism of a first link or upper arm, the forearm, and the end effector structure of the robot arm of the Genov et al. patent is more complex than that of the robot arm of the Abbe et al. patent. Nevertheless, the robot arm structures of the Abbe et al. and Genov et al. patents operate similarly in that each of the end effector structures picks up and transports specimens by using one motor to extend and retract a hand and another, different motor to rotate the entire robot arm structure to allow the hand to extend and retract at different ones of a restricted number of angular positions.

Robot arms of the type described by the Abbe et al. and Genov et al. patents secure a specimen to the hand by means of vacuum pressure delivered to the hand through fluid conduits extending through the upper arm, forearm, and hand and around all of the pivot axes. The Abbe et al. patent is silent about a vacuum pressure delivery system, and the Genov et al. patent describes the use of flexible fluid conduits. The presence of flexible fluid conduits limits robot arm travel path planning because unidirectional robot arm link rotation about the pivot axes "winds up" the conduits and eventually causes them to break. Thus, conduit breakage prevention requirements prohibit continuous robot arm rotation about any of the pivot axes and necessitate rewind maneuvers and travel path "lockout" spaces as part of robot arm travel path planning. The consequences of such rewind maneuvers are more complex and limited travel path planning, reduced throughput resulting from rewind time, and reduced available work space because of the lockout spaces.

Moreover, subject to lockout space constraints, commercial embodiments of such robot arms have delivered specimens to and retrieve specimens from stations angularly positioned about paths defined only by radial distances from the axes of rotation of the robot arms. Thus, the robot arm structures described by the Abbe et al. and Genov et al. patents are incapable of transporting specimens between processing stations positioned in compact, irregularly shaped working spaces. For example, neither of these robot arm structures is set up to remove specimen wafers from and place specimen wafers in wafer cassettes having their openings positioned side-by-side in a straight line arrangement of a tightly packed working space.

SUMMARY OF THE INVENTION

An object of the invention is, therefore, to provide a multiple link robot arm system that has straight line motion, extended reach, corner reacharound, and continuous bidirectional rotation capabilities for transporting specimens to virtually any location in an available work space that is free of lockout spaces.

Another object of the invention is to provide such a system that increases specimen processing throughput in the absence of robot arm rewind time and radial positioning of processing station requirements.

A further object of this invention is to provide such a system that is capable of continuous rotation in either direction with no susceptibility to kinking, twisting, or breaking of conduits delivering vacuum pressure to the hand.

Still another object of the invention is to provide such a system that uses two motors capable of synchronous operation and a linkage coupling mechanism that permit a hand of an end effector structure to change its extension as the multiple link robot arm mechanism to which the hand is associated changes its angular position.

Each of two preferred embodiments of the present invention includes two end effectors or hands. A first embodiment comprises two multiple link robot arm mechanisms mounted on a torso link that is capable of 360 degree rotation about a central or "torso" axis. Each robot arm mechanism includes an end effector having a single hand. A second embodiment is a modification of the first embodiment in that the former has one of the robot arm mechanisms removed from the torso link and substitutes on the remaining robot arm mechanism an end effector with oppositely extending hands for the end effector having a single hand.

Each of the multiple link robot arm mechanisms of the first and second embodiments uses two motors capable of synchronized operation to permit movement of the robot arm hand along a curvilinear path as the extension of the hand changes. A first motor rotates a forearm about an elbow axis that extends through distal and proximal ends of the upper arm and forearm, respectively, and a second motor rotates an upper arm about a shoulder axis that extends through a proximal end of the upper arm. A mechanical linkage couples the upper arm and the forearm. The mechanical linkage forms an active drive link and a passive drive link. The active drive link operatively connects the first motor and the forearm to cause the forearm to rotate about the elbow axis in response to the first motor. The passive drive link operatively connects the forearm and the hand to cause the hand to rotate about a wrist axis in response to rotation of the forearm about the elbow axis. The wrist axis extends through distal and proximal ends of the forearm and hand, respectively.

In two embodiments described in detail below, a motor controller controls the first and second motors in two preferred operational states to enable the robot arm mechanism to perform two principal motion sequences. The first operational state maintains the position of the first motor and rotates the second motor so that the mechanical linkage causes linear displacement (i.e., extension or retraction) of the hand. The second operational state rotates the first and second motors so that the mechanical linkage causes angular displacement of the hand about the shoulder axis. The second operational state can provide an indefinite number of travel paths for the hand, depending on coordination of the control of the first and second motors.

Whenever the first and second motors move equal angular distances, the angular displacement of the upper arm about the shoulder axis and the angular displacement of the forearm about the elbow axis equally offset and thereby result in only a net angular displacement of the hand about the shoulder axis. Thus, under these conditions, there is no linear displacement of the hand and no rotation of the hand about the wrist axis. Whenever the first and second motors move different angular distances, the angular displacement of the upper arm about the shoulder axis and the angular displacement of the forearm about the elbow axis only partly offset and thereby result in angular displacements of the hand about the shoulder and wrist axes and consequently a linear displacement of the hand. Coordination of the position control of the first and second motors enables the robot arm mechanism to describe a compound curvilinear path of travel for the hand.

A third or torso motor rotates the torso link about the central axis, which extends through the center of the torso link and is equidistant from the shoulder axes of the robot arm mechanisms of the first embodiment. The motor controller controls the operation of the torso motor to permit rotation of the torso link independent of the motion of the robot arm mechanism or mechanisms mounted to it. The presence of the rotatable torso link together with the independent robot arm motion permits simple, nonradial positioning of specimen processing stations relative to the torso axis, extended paddle reach, and corner reacharound capabilities. The consequence is a high speed, high throughput robot arm system that operates in a compact work space.

Each of the robot arm mechanisms of the first embodiment is equipped with a rotary fluid slip ring acting as a fluid feedthrough conduit. These slip rings permit the hand to rotate continuously in a single direction as the robot arm links rotate continuously about the shoulder, elbow, and wrist axes without a need to unwind to prevent kinking or twisting of fluid pressure lines. Vacuum pressure is typically delivered through the fluid pressure lines.

The robot arm mechanism of the second embodiment is equipped with a rotary fluid multiple-passageway spool that delivers fluid pressure separately to each rotary joint of and permits continuous rotation of the robot arm links in a single direction about the central, shoulder, elbow, and wrist axes.

Additional objects and advantages of this invention will be apparent from the following detailed description of preferred embodiments thereof which proceeds with reference to the accompanying drawings.

BRIEF DESCRIPTION OF THE DRAWINGS

FIGS. 1A, 1B, and 1C are respective side elevation, plan, and cross-sectional views of a two-arm, multiple link robot arm system of the present invention.

FIGS. 4A and 4B are respective cross-sectional and fragmentary plan views showing the interior components, mechanical linkage, and fluid pressure line paths of the robot arm system of FIGS. 1A, 1B, and 1C.

FIGS. 7A and 7B are respective side elevation and plan views of an alternative one-arm, multiple link robot arm system having an end effector structure with two oppositely extending hands.

FIGS. 8A-1 and 8A-2 and FIG. 8B are respective fragmentary cross-sectional and plan views showing the interior components, mechanical linkage, and fluid pressure line paths of the robot arm system of FIGS. 7A and 7B.

DETAILED DESCRIPTION OF THE PREFERRED EMBODIMENTS

Figure 1C:
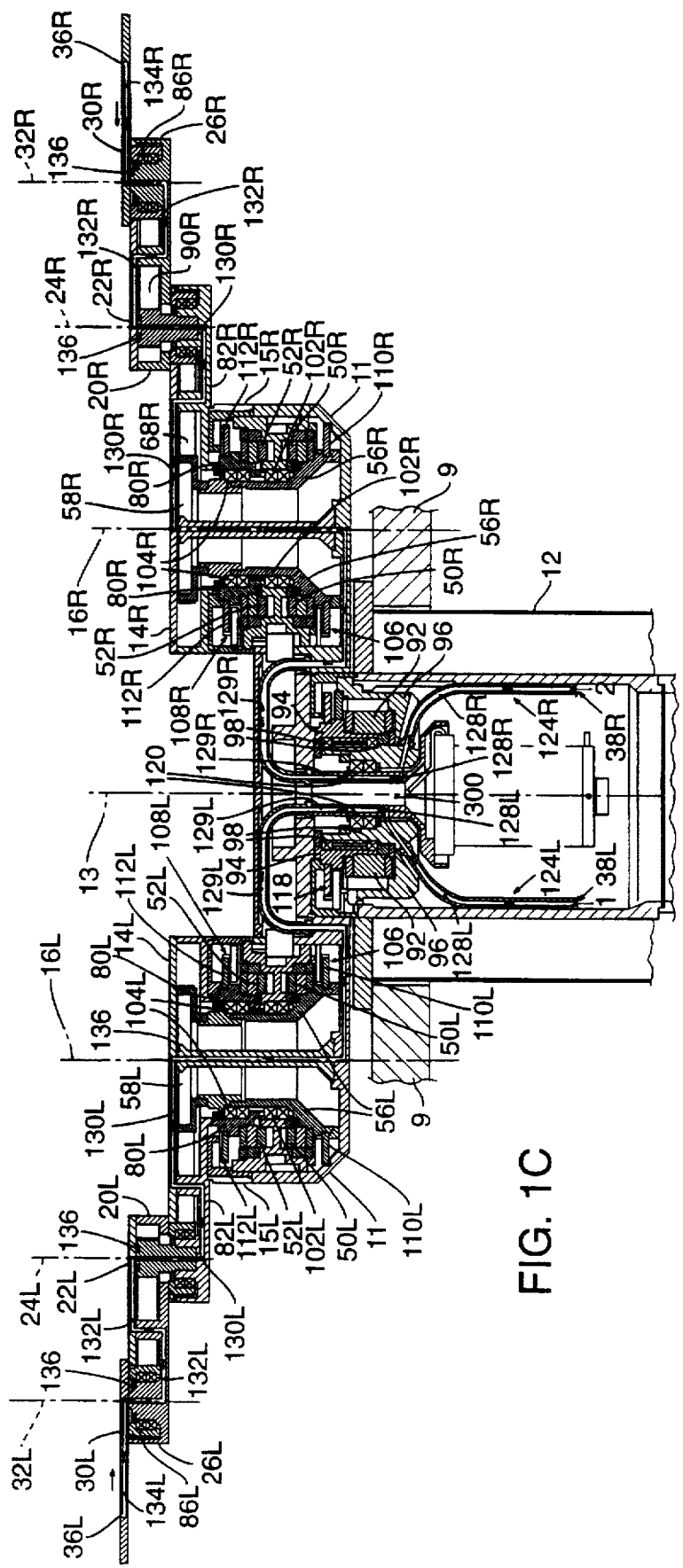

FIGS. 1A, 1B, and 1C are respective side elevation, plan, and cross-sectional views of a two-arm, multiple link robot arm system 8 mounted on and through an aperture in the top surface of a support table 9.

With reference to FIGS. 1A and 1B, two similar but independently controllable three-link robot arm mechanisms 10L and 10R are rotatably mounted at opposite ends of a torso link 11, which is mounted to the top surface of a base housing 12 for rotation about a central or torso axis 13. Because they are mirror images of each other, robot arm mechanisms 10L and 10R have corresponding components identified by identical reference numerals followed by the respective suffices "L" and "R". Accordingly, the following discussion is directed to the construction and operation of only robot arm mechanism 10R but is similarly applicable to robot arm mechanism 10L.

Robot arm mechanism 10R comprises an upper arm 14R mounted to the top surface of a cylindrical spacer 15R, which is positioned on the right-hand end of torso link 11 for rotation about a shoulder axis 16R. Cylindrical spacer 15R provides room for the motors and certain other components of robot arm mechanism 10R, as will be described below. Upper arm 14R has a distal end 18R to which a proximal end 20R of a forearm 22R is mounted for rotation about an elbow axis 24R, and forearm 22R has a distal end 26R to which a proximal end 28R of a hand 30R is mounted for rotation about a wrist axis 32R. Hand 30R is equipped at its distal end 34R with a fluid pressure outlet 36R that preferably applies vacuum pressure supplied to robot arm mechanism 10R at an inlet 38 to securely hold a semiconductor wafer, compact disk, or other suitable specimen (not shown) in place on hand 30R. As will be described in detail later, each of upper arm 14R, forearm 22R, and hand 30R is capable of continuous rotation about its respective shoulder axis 16R, elbow axis 24R, and wrist axis 32R.

Figure 2:
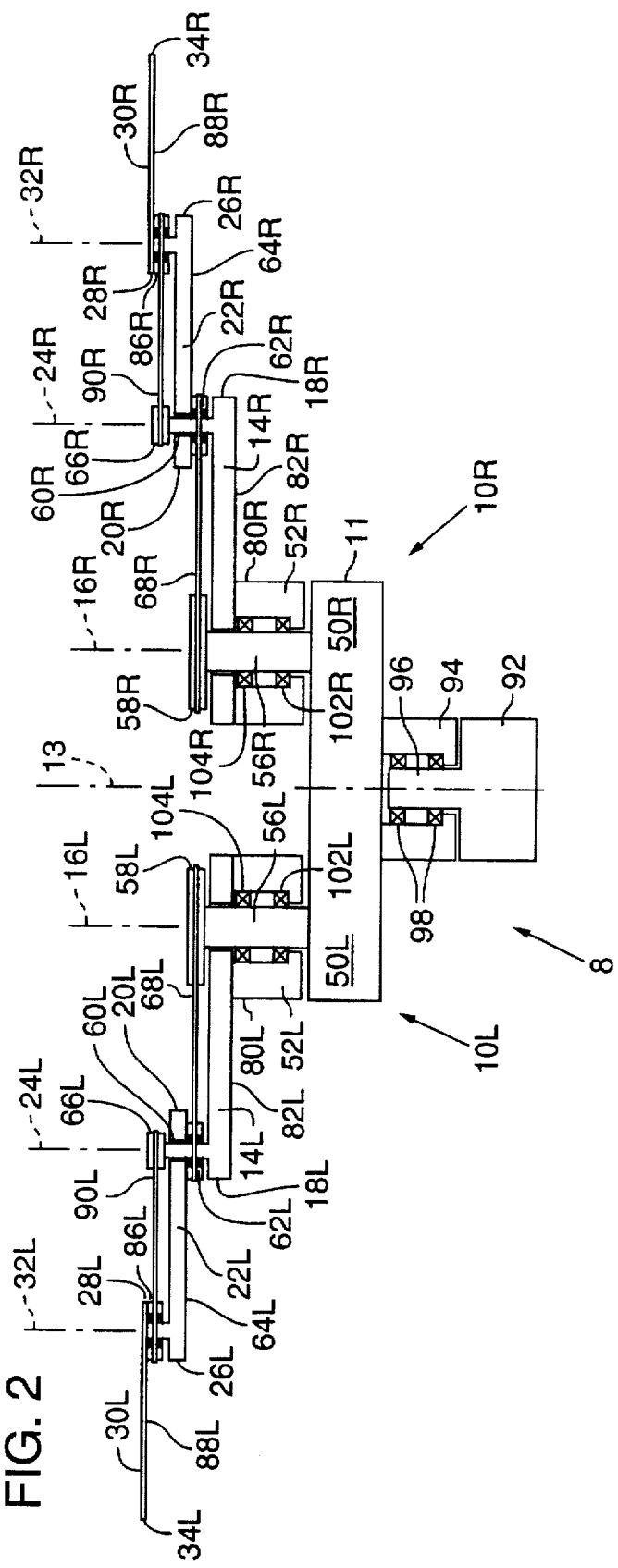
FIG. 2 is a side elevation view in stick diagram form showing the link components and the associated mechanical linkage of the robot arm system of FIGS. 1A, 1B, and 1C.
Figure 6A:
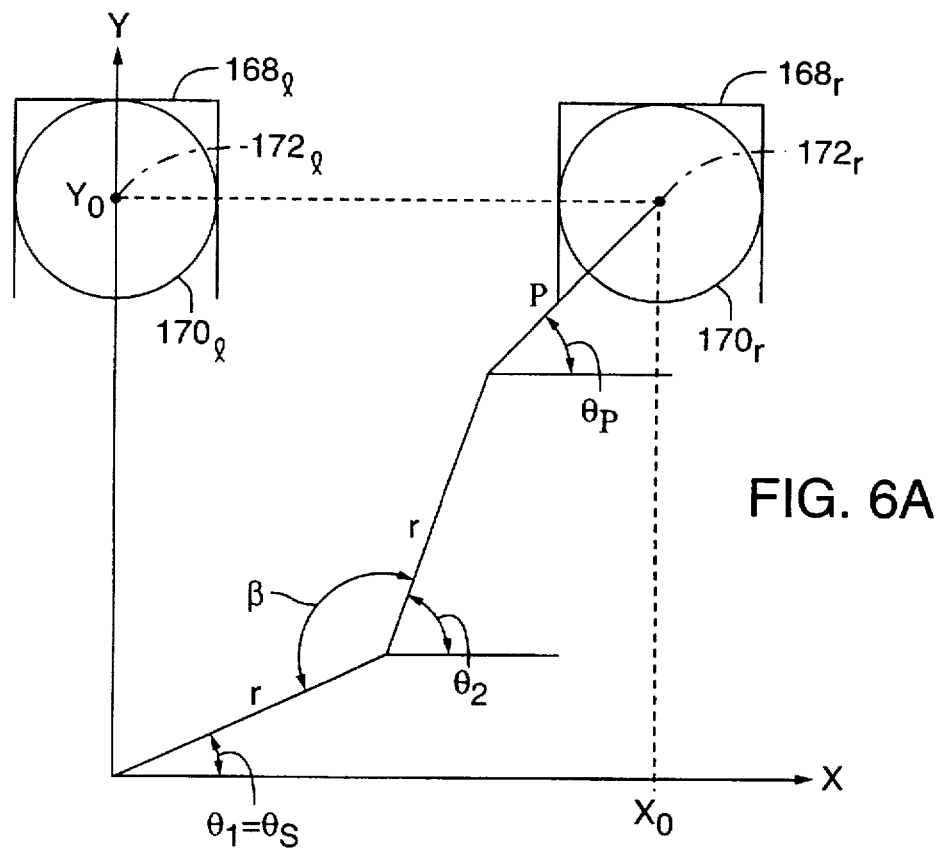
FIG. 6A is a diagram showing the spatial relationships and parameters that are used to derive control signals provided by, and FIG. 6B is a block diagram of, the motor controller for the embodiments of the dual end effector, multiple link robot arm system of the invention.
Figure 6B:
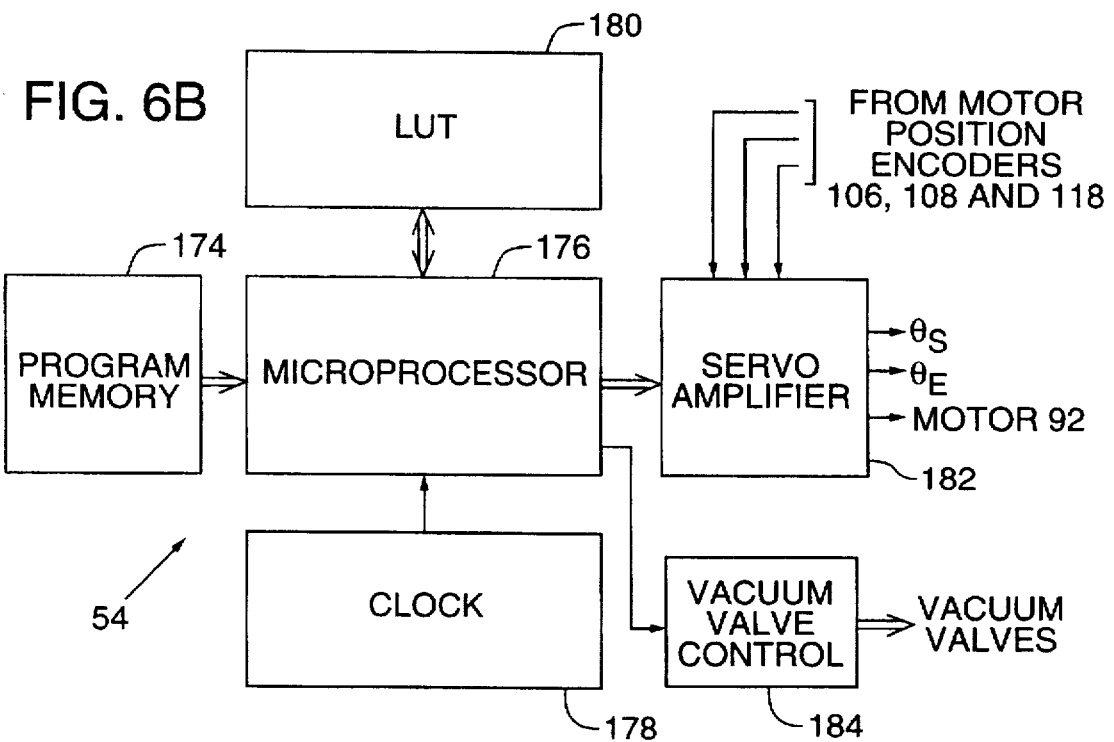

FIG. 2 shows the link components and associated mechanical linkage of robot arm mechanism 10R. With reference to FIG. 2, robot arm mechanism 10R is positioned by first and second concentric motors 50R and 52R that operate in response to commands provided by a motor controller 54 (FIGS. 6A and 6B). First motor 50R rotates forearm 22R about elbow axis 24R, and second motor 52R rotates upper arm 14R about shoulder axis 16R.

More specifically, first motor 50R rotates a forearm spindle 56R that extends through an aperture in upper arm 14R and terminates in an upper arm pulley 58R. A post 60R extends upwardly at distal end 18R of upper arm 14R through the center of a bearing 62R that is mounted to a bottom surface 64R of forearm 22R at its proximal end 20R. Post 60R also extends through an aperture in forearm 22R and terminates in a forearm pulley 66R. An endless belt 68R connects upper arm pulley 58R and the outer surface of bearing 62R to rotate forearm 22R about elbow axis 24R in response to rotation of first motor 50R.

Second motor 52R rotates an upper arm spindle 80R that is mounted to a bottom surface 82R of upper arm 14R to rotate upper arm 14R about shoulder axis 16R. Coordinated operation of first and second motors 50R and 52R in conjunction with the mechanical linkage described below causes hand 30R to rotate about shoulder axis 16R. A post 84R extends upwardly through the center of a bearing 86R that is mounted to a bottom surface 88R of hand 30R. An endless belt 90R connects forearm pulley 66R to the outer surface of bearing 86R to rotate hand 30R about shoulder axis 16R in response to the coordinated rotational motions of motors 50R and 52R.

The mechanical linkage coupling upper arm 14R and forearm 22R forms an active drive link and a passive drive link. The active drive link includes belt 68R connecting upper arm pulley 58R and the outer surface of bearing 62R and causes forearm 22R to rotate in response to rotation of first motor 50R. The passive drive link includes belt 90R connecting forearm pulley 66R and the outer surface of bearing 86R and causes hand 30R to rotate about wrist axis 32R in response to rotation of forearm 22R about elbow axis 24R. Rotation of hand 30R can also be caused by a complex interaction among the active and passive drive links and the rotation of upper arm 14R in response to rotation of second motor 52R.

A third or torso motor 92 rotates a torso link spindle 94 that is mounted to a bottom surface of torso link 11, to which robot arm mechanism 10R is rotatably mounted. A main ring 96 supports a bearing assembly 98 around which spindle 94 rotates. Motor 92 is capable of 360 degree continuous rotation about central axis 13 and therefore can, in cooperation with robot arm mechanism 10R, move hand 30R along an irregular path to any location within the reach of hand 30R.

Figure 3:
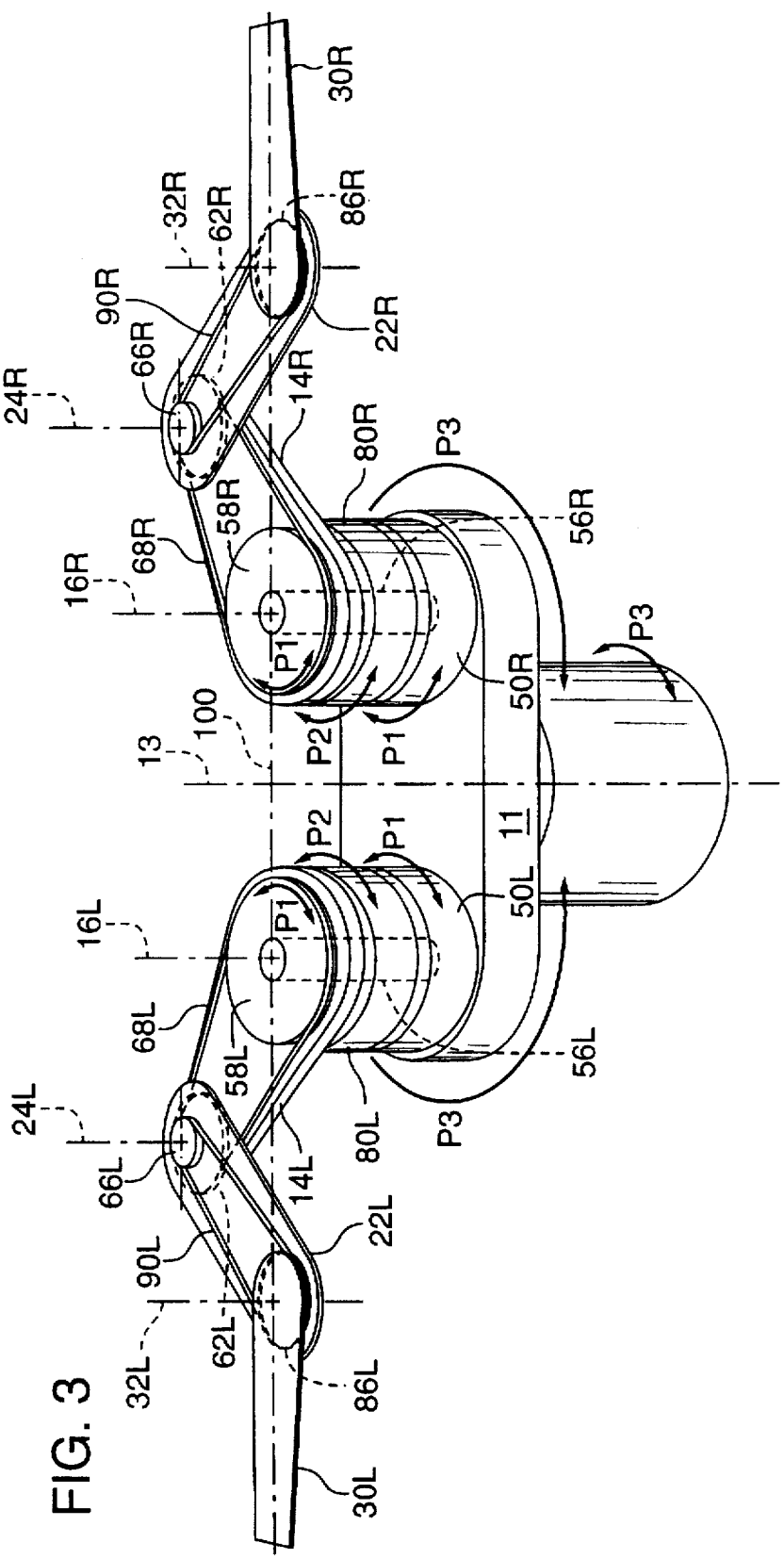
FIG. 3 is an isometric view in stick diagram form showing the rotational motion imparted by the motor drive links of the mechanical linkage of the robot arm system of FIGS. 1A, 1B, and 1C.

Motor controller 54 (FIGS. 6A and 6B) controls motors 50R and 52R in two preferred operational states to enable robot arm mechanism 10R to perform two principal motion sequences. The first motion sequence changes the extension or radial position of hand 30R, and the second motion sequence changes the angular position of hand 30R relative to shoulder axis 16R. FIG. 3 is a useful diagram for showing the two motion sequences.

With reference to FIGS. 2 and 3, in the first operational state, motor controller 54 causes first motor 50R to maintain the position of forearm spindle 56R and second motor 52R to rotate upper arm spindle 80R. The non-rotation of first motor 50R maintains the position of upper arm pulley 58R, and the rotation of upper arm spindle 80R by second motor 52R rotates upper arm 14R about shoulder axis 16R, thereby causing rotation of forearm 22R about elbow axis 24R and counter-rotation of hand 30R about wrist axis 32R. Because the ratio of the diameters of upper arm pulley 58R and the outer surface of bearing 62R are 4:2 and the ratio of the diameters of forearm pulley 66R and the outer surface of bearing 86R is 1:2, the rotation of upper arm 14R in a direction specified by $P_2$ shown in FIG. 3 will cause hand 30R to move along a straight line path 100. (The diameters of forearm pulley 66R and the outer surface of bearing 86R are one-half of the diameters of, respectively, the outer surface of bearing 62R and upper arm pulley 58R to streamline the sizes and shapes of forearm 22R and hand 30R.)

Whenever upper arm 14R rotates in the clockwise direction specified by $P_2$, hand 30R extends (i.e., increases radial distance from shoulder axis 16R) along path 100. Whenever upper arm 14R rotates in the counter-clockwise direction specified by $P_2$, hand 30R retracts (i.e., decreases radial distance from shoulder axis 16R) along path 100. Skilled persons will appreciate that robot arm mechanism 10 in a mirror image configuration of that shown in FIG. 3 would extend and retract in response to upper arm 14 rotation in directions opposite to those described. FIG. 1B shows that when robot arm mechanism 10R is extended, axes 13, 16R, 24R, and 32R are collinear.

In the second operational state, motor controller 52R causes first motor 50R to rotate forearm spindle 56R in the direction specified by $P_1$ and second motor 52R to rotate upper arm spindle 80R in the direction specified by $P_2$. In the special case in which motors 50R and 52R are synchronized to rotate in the same direction by the same amount of displacement, hand 30R is only angularly displaced about shoulder axis 16R. This is so because the rotation of forearm 22R about elbow axis 24R caused by the rotation of first motor 50R and the rotation of hand 30R about wrist axis 32R caused by rotation of second motor 52R and the operation of the passive drive link offset each other to produce no net rotation about elbow axis 24R and wrist axis 32R. Thus, hand 30R is fixed radially at a point along path 100 and describes a circular path as only upper arm 14R rotates about shoulder axis 16R. By application of kinematic constraints to achieve a desired travel path for hand 30, motor controller 54 can operate first and second motors 50R and 52R to move robot arm mechanism 10R along non-radial straight line paths, as will be further described below.

Skilled persons will appreciate that to operate robot arm mechanism 10R, first and second motors 50R and 52R are coupled by either rotating both of them or grounding one while rotating the other one. For example, robot arm mechanism 10R can be operated such that forearm 22R rotates about elbow axis 24R. Such motion would cause hand 30R to describe a simple spiral path between shoulder axis 16R and the full extension of hand 30R. This motion is accomplished by fixing the position of shoulder 14R and operating motor 50R to move forearm 22R. Applicants note that the prior art described above is incapable of rotating the elbow joint without also rotating the shoulder joint, thereby requiring the operation of two motors.

Motor controller 54 controls the operation of torso motor 92 and therefore the rotation of torso link 11 in a direction specified by $P_3$ independently of the operational states of motors 50R and 52R.

FIGS. 4A and 4B show the interior components, mechanical linkage, and fluid pressure conduits of robot arm mechanism 10R shown in FIGS. 1A, 1B, and 1C. With reference to FIGS. 4A and 4B, a motor housing composed of an interior portion of torso link 11 and a cylindrical spacer 15R contains first motor 50R and second motor 52R arranged in concentric relation such that their respective forearm spindle 56R and upper arm spindle 80R rotate about shoulder axis 16R. Forearm spindle 56R is positioned nearer to shoulder axis 16R and is directly connected to upper arm pulley 58R journalled for rotation on bearings 102R. Upper arm spindle 80R is positioned farther radially from shoulder axis 16R and is directly connected to bottom surface 82R of upper arm 14R journalled for rotation on bearings 104R. The angular positions of motors 50R and 52R are tracked by respective glass scale encoders 106R and 108R. Encoders 106R and 108R include respective annular diffraction grating scales 110R and 112R and respective light source/detector subassemblies (not shown). Such glass scale encoders are known to skilled persons.

Base housing 12 contains motor 92, which is arranged such that torso link spindle 94 journalled on bearings 98 rotates about central axis 13. The angular position of motor 92 is tracked by a glass scale encoder 118 of a type similar to encoders 106R and 108R.

Robot arm system 8 includes two separate fluid pressure conduits 124L and 124R each including multiple path segments, with conduit 124L extending between fluid pressure inlet 38L and outlet 36L of fluid pocket or land 126L and conduit 124R extending between fluid pressure inlet 38R and outlet 36R of land 126R. In the preferred embodiments described, the fluid pressure conduits deliver vacuum pressure but are capable of delivering positive amounts of fluid pressure. Each of path segments 128L and 128R in base housing 12 and of path segments 129L and 129R in torso link 11 is partly a flexible hose and partly a hole in a solid component.

Path segments 130R, 132R, and 134R in the respective upper arm 14R, forearm 22R, and hand 30R are either channels formed by complementary depressions in mating components or holes passing through solid components. Outlet 36R constitutes a hole in vacuum land 126R on the specimen-contacting surface of hand 30R.

Each path segment terminating or originating at shoulder axis 16R, elbow axis 24R, and wrist axis 32R includes a rotary fluid slip ring 136 that functions as a vacuum feedthrough conduit that permits continuous rotation about any one of these three axes. Path segments 128R and 129R are joined at central axis 13 by an enlarged version of a rotary multiple fluid-passageway spool 300, which rotates within a bearing assembly 120 supported by main ring 96. Spool 300 is described below with reference to FIGS. 9A and 9B in connection with the detailed description of the alternative preferred embodiment.

Figure 5B:
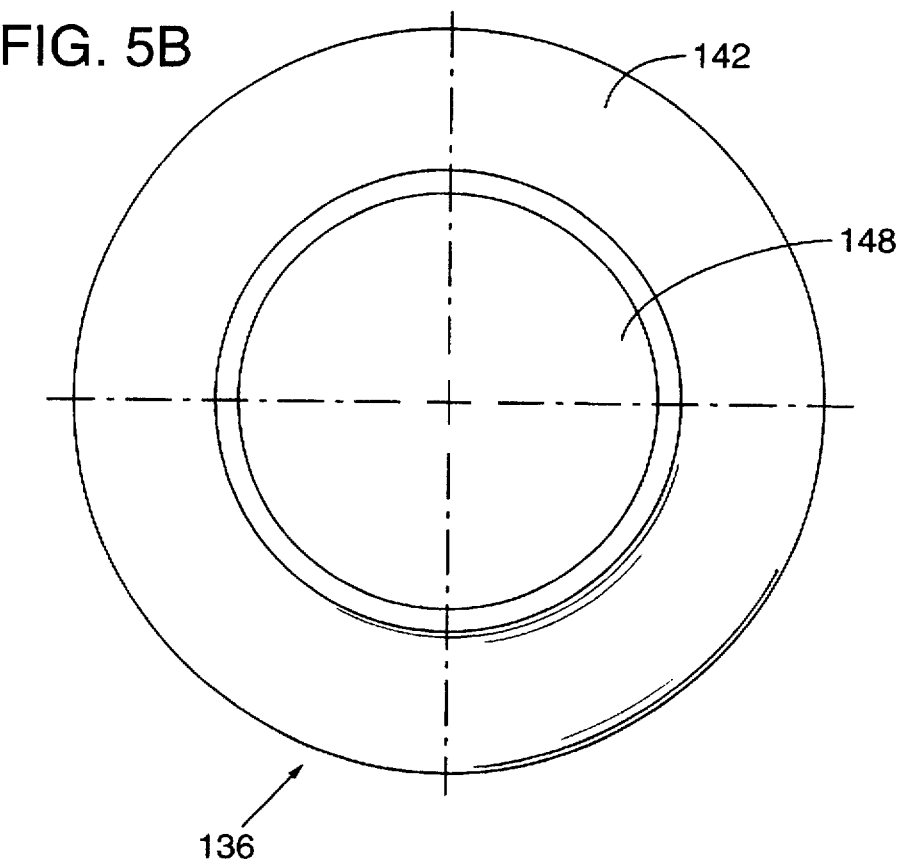
FIGS. 5A and 5B are respective side elevation and plan views of a rotary fluid slip ring installed at each rotary joint of the robot arm system of FIGS. 1A, 1B, and 1C.
Figure 5A:
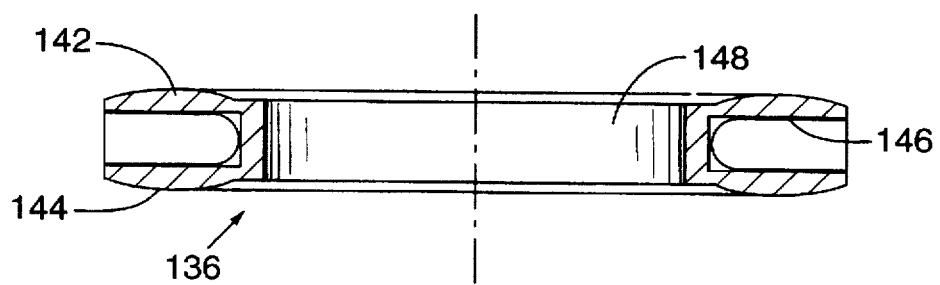

FIGS. 5A and 5B show rotary fluid slip ring 136, which is fitted into each of the rotary joints at shoulder axis 16R, elbow axis 24R, and wrist axis 32R. For purposes of convenience only, the following describes the operation of slip ring 136 in the rotary joint defining wrist axis 32R.

With reference to FIGS. 4A, 4B, 5A, and 5B, slip ring 136 includes a convex upper surface 142 and a convex lower surface 144 separated by an annular leaf spring 146. Each of surfaces 142 and 144 is preferably made of a reinforced Teflon® co-polymer and has a central aperture 148. When it is fitted in a rotary joint, slip ring 136 receives through central aperture 148 a protrusion 150 from the top surface of post 84R that extends from distal end 26R of forearm 22R. Protrusion 150 has a hole 152 that extends into and through post 84R along its entire length and is in fluid communication with vacuum path segment 132R within forearm 22R. The wrist joint formed by forearm 22R and hand 30R causes upper surface 142 to fit against an interior vacuum channel surface 154R of hand 30R and lower surface 144 to fit against a depression 156R in the top surface of post 84R. The raised upper and lower surfaces 142 and 144 compress against leaf spring 146 and form a vacuum seal for the space between the top of protrusion 150 and vacuum channel surface 154R of hand 30R. The reinforced co-polymer material from which upper surface 142 is made forms a bearing surface that maintains a vacuum-tight seal during rotary motion about wrist axis 32R.

The mechanical construction of robot arm mechanism 10 does not restrict hand 30R to straight line motion but provides two degrees of freedom to achieve complex trajectories. This is beneficial because it facilitates specimen processing layouts to provide relatively small footprints and processing component placements that enhance ergonomic loading of specimens. A common application is to access specimens in straight line rather than complex hand movements. Thus, the following description gives an example of how a skilled person would implement controller 54 to carry out this common specimen access operation.

FIG. 6A is a diagram that specifies a local coordinate axis frame whose axes are defined by the orientation of a semiconductor wafer cassette $168_r$ and its location relative to shoulder axis 16R. With reference to FIG. 6A, the following description sets forth the mathematical expressions from which are derived the command signals controller 54 uses to retrieve from cassette $168_r$ a wafer $170_r$ along a vector perpendicular to the opening of cassette $168_r$.

The following parameters are pertinent to the derivation of the path of travel of hand 30:

$\Theta_S$=angle of motor 52R $\Theta_E$=angle of motor 50R r=distance between shoulder axis 16R and elbow axis 24R and distance between elbow axis 24R and wrist axis 32R β=angle between upper arm 14R and forearm 22R p=length of hand 30R E=2r=extension of robot arm $R_i$=reach of robot arm (i.e., its radius measured from shoulder axis 16R to the center $172_r$ of wafer $170_r$ positioned on hand 30R).

Application of the law of cosines provides the following expressions for $R_i$:

$$R_i = p + \sqrt{(r^2 + r_2 - 2r^2\cos\beta)} \quad (1)$$
$$= p + \sqrt{2} \; r \sqrt{(1 - \cos\beta)} \; .$$

For β=0, equation (1) provides that $R_i$=p and x=0, y=0, $\Theta_S=\Theta_{S_R}$, $\Theta_E=\Theta_{E_R}$. The quantities $\Theta_{S_R}$ and $\Theta_{E_R}$ represent reference motor angles. The motor angles may be expressed as $\Theta_S=\Theta_{S_R}+\Delta\Theta_{S_R}$, $\Theta_E=\Theta_{E_R}+\Delta\Theta_{E_R}$. The angle β may be expressed as $\beta=2(\Delta\Theta_{S_R}-\Delta\Theta_{E_R})$ because of the construction of the mechanical linkages of robot arm mechanism 10R. This equation relates the angle β to changes in the motor angles.

To retrieve wafer $170_r$ from cassette $168_r$ along a straight line path, the displacement along the X-axis equals $X_O$, which is a constant. Thus, $X(t)=X_O$. The quantity $X(t)$ can be expressed as a function of the lengths of the X-axis components of its links:

$$X(t) = r \cos \Theta_1 + r \cos \Theta_2 + p \cos \Theta_p, \quad (2)$$

in which $\Theta_1$=angle of upper arm 14R $\Theta_2$=angle of forearm 22R $\Theta_p$=angle of hand 30R.

Because upper arm 14R and forearm 22R are of the same length (r), $\Theta_1$ tracks the angle $\Theta_S$ of motor 52R, and hand 30R moves in a straight line, the following expressions hold:

$$\theta_1 = \theta_S$$
$$\theta_2 = \theta_1 + \pi - \beta$$
$$\theta_p = \theta_1 + \left( \frac{\pi - \beta}{2} \right).$$

Thus, to compute $X_O$, one substitutes the foregoing identities for $\Theta_1$, $\Theta_2$, and $\Theta_p$ into equation (2) for $X(t)$ and finds:

$$X_O = r(\cos \theta_1 + \cos \theta_2) + p \cos \theta_p \quad (3)$$

$$X_O = r(\cos \theta_1 + \cos(\theta_1 + \pi - \beta)) + p \cos \left( \theta_1 + \frac{\pi}{2} - \frac{\beta}{2} \right)$$

$$X_O = r(\cos \theta_1 - \cos(\theta_1 - \beta)) - p \sin \left( \theta_1 - \frac{\beta}{2} \right).$$

Equation (3) expresses the constraint that sets out the relationship between the angles $\Theta_S$ and $\Theta_E$ of motors 52R and 50R operating to move equal angular distances to achieve straight line movement of hand 30R.

Skilled persons can implement constraint equation (3) by means of a servomechanism controller in any one of a number of ways. For example, to achieve high speed operation to implement a given wafer move profile, one can compute from equation (3) command signal values and store them in a look-up table for real-time use. The precomputation process would entail the indexing of $\Theta_S$ in accordance with the wafer move profile and determining from equation (3) the corresponding $\Theta_E$ values, thereby configuring the displacement of $\Theta_S$ and $\Theta_E$ in a master-slave relationship.

To achieve angular displacement of hand 30R about shoulder axis 16R, controller 54 causes motors 50R and 52R to rotate in the same direction through the desired angular displacement of hand 30R to reach the desired destination. The linear extension of hand 30R does not change during this move. Skilled persons will appreciate that complicated concurrent linear and angular displacement move profiles of hand 30R could be accomplished by programming controller 54 to operate motors 50R and 52R through different angular displacements. FIG. 6A shows a second wafer cassette $168_\lambda$ positioned so that the center $172_\lambda$ of a stored wafer $170_\lambda$ is coincident to $Y_O$. The parallel arrangement of the openings of cassettes $168_\lambda$ and $168_r$ demonstrates that the above expressions can be used to retrieve wafers stored in cassettes not positioned a radial distance from shoulder axis 16. Such nonradial placement is not implemented in the prior art references described above. Robot arm mechanism 10 is not restricted to radial placement but can accommodate any combination of distances within its reach.

FIG. 6B is a simplified block diagram showing the primary components of controller 54. With reference to FIG. 6B, controller 54 includes a program memory 174 that stores move sequence instructions for robot arm mechanism 10R. A microprocessor 176 receives from program memory 174 the move sequence instructions and interprets them to determine whether the first or second operational state is required or whether motion of motor 92 is required to position torso link 11. A system clock 178 controls the operation of microprocessor 176. A look-up table (LUT) 180 stores corresponding values for $\Theta_S$ (motor 52R) and $\Theta_E$ (motor 50R) to accomplish the straight line motion of the first operational state and the angular displacements of $\Theta_S$ and $\Theta_E$ to accomplish the angular motion of the second operational state. Because the rotation of torso link 11 is independent of the motions of the robot arm mechanisms mounted to it, the overall coordination of the angular displacement of motor 92 with the angular displacements of motors 50R and 52R is carried out in the move sequence instructions, not in LUT 180. This results in higher speed and more accurate straight line motion because multiple axis servomechanism following errors and drive accuracy errors do not affect the straight line path of hand 30R.

Microprocessor 176 provides $\Theta_S$ and $\Theta_E$ position signals to a servomechanism amplifier 182, which delivers $\Theta_S$ and $\Theta_E$ command signals to motors 52R and 50R, respectively. Microprocessor 176 also provides position signals to servomechanism amplifier 176 to deliver a command signal to torso motor 92. Servomechanism amplifier 182 receives from glass scale encoders 106, 108, and 118 signals indicative of the angular positions of the respective motors 50R, 52R, and 92.

Microprocessor 176 also provides control signals to a vacuum valve controller 184, which causes a vacuum valve (not shown) to provide from a vacuum source (not shown) an appropriate amount of vacuum pressure to outlet 36 in response to the need to hold a wafer on or release a wafer from hand 30R.

Figures 1, 8A:
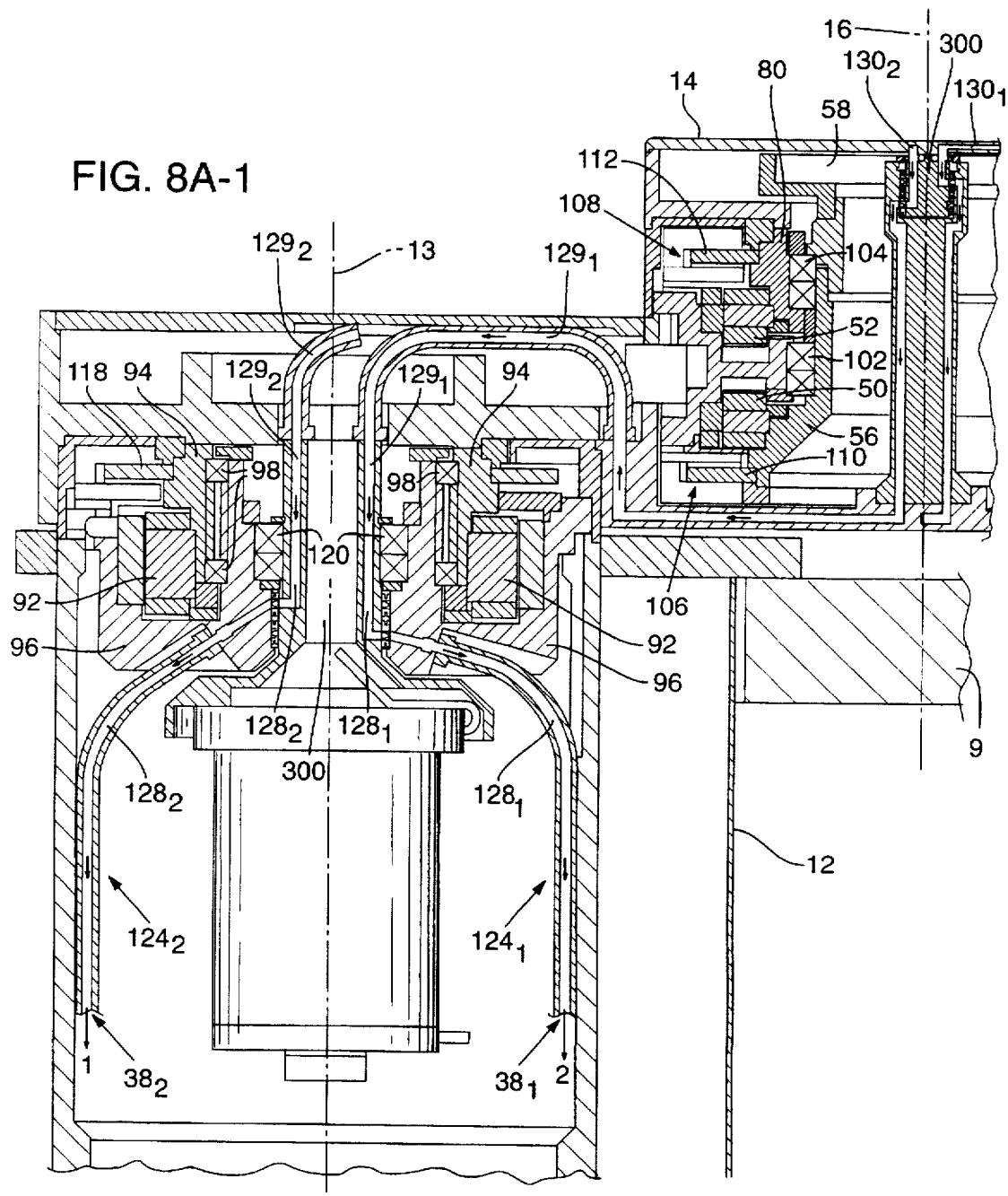
Figure 8B:
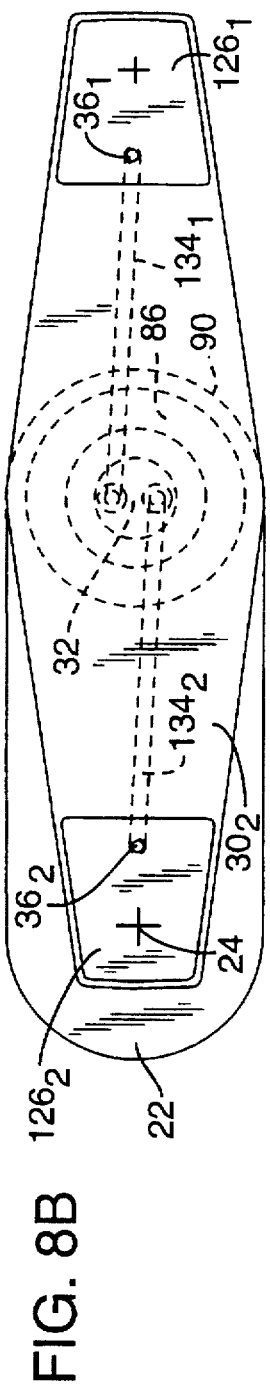
Figures 2, 8A:
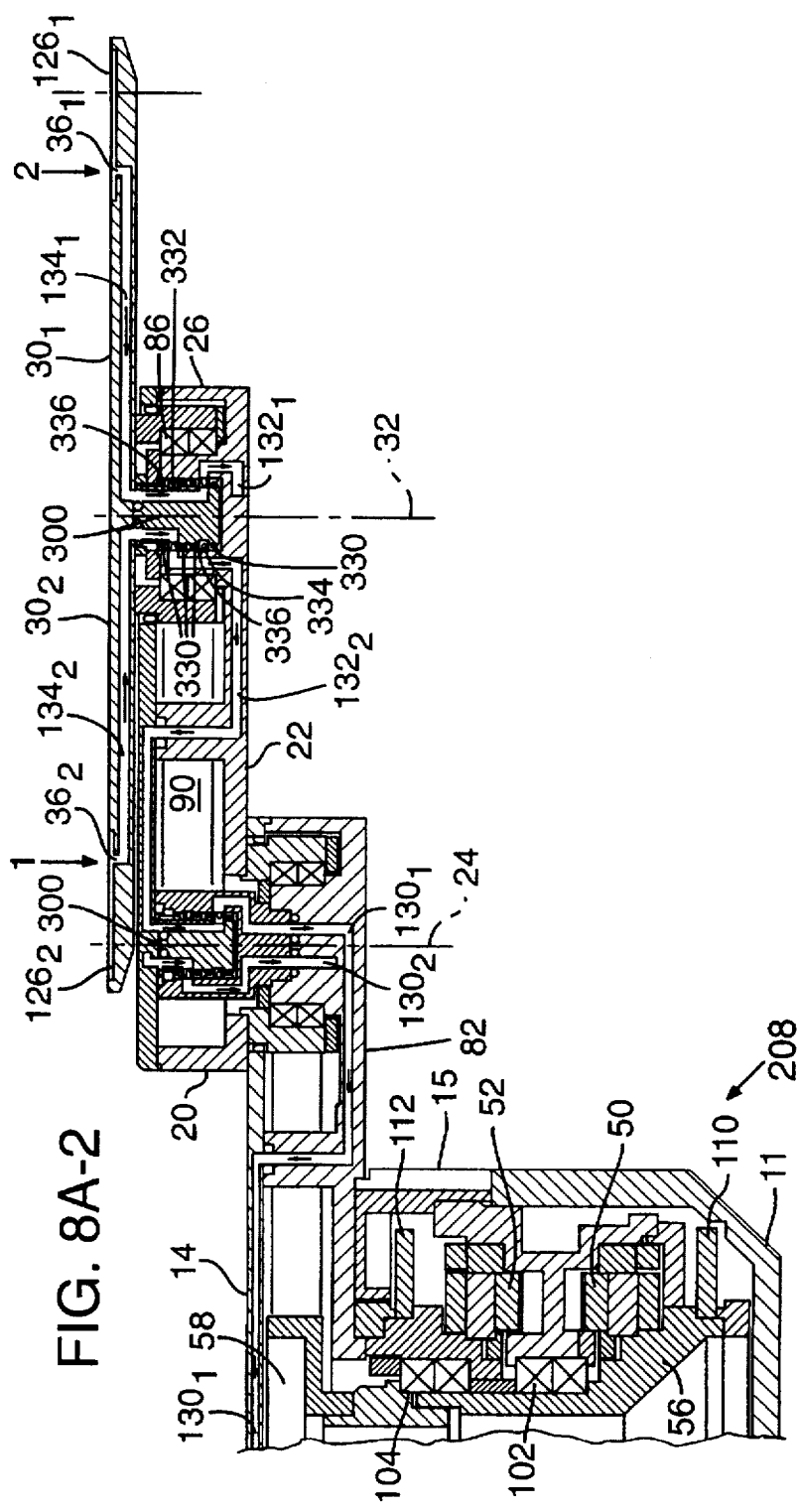

FIGS. 7A and 7B show an alternative one-arm, multiple link robot arm system 208 of similar design to robot arm system 8 with the significant exceptions that robot arm mechanism 10L is absent and the consequent excess length of torso link 11 is removed, and an end effector structure 230 having two oppositely extending hands $30_1$ and $30_2$ is substituted for hand 30R. FIGS. 8A and 8B show the interior components, mechanical linkage, and vacuum pressure line paths of robot arm mechanism 208. Because of the similarity of robot arm systems 8 and 208, their corresponding components and axes of rotation are identified by identical reference numerals. For purposes of clarity, the suffix "R" has been omitted.

With reference to FIGS. 7A and 7B, end effector structure 230 includes oppositely extending hands $30_1$ and $30_2$ that rotate about wrist axis 32. Because they retrieve and deliver separate specimens, hand $30_1$ has a vacuum land $126_1$ with an outlet $36_1$ and hand $30_2$ has a vacuum land $126_2$ with an outlet $36_2$ that are connected to separate vacuum pressure conduits routed within base housing 12, torso link 11, upper arm 14, and forearm 22.

With reference to FIGS. 8A-1 and 8A-2 and FIG. 8B, robot arm mechanism 210 includes two separate vacuum pressure conduits $124_1$ and $124_2$ each including multiple path segments, with conduit $124_1$ extending between vacuum pressure inlet $38_1$ and outlet $36_1$ of vacuum land $126_1$ and conduit $124_2$ extending between vacuum pressure inlet $38_2$ and outlet $36_2$ of vacuum land $126_2$. Path segments $128_1$ and $128_2$ of the respective conduits $124_1$ and $124_2$ are flexible hoses. Path segments $129_1$ and $129_2$ in torso link 11, path segments $130_1$ and $130_2$ in upper arm 14, path segments $132_1$ and $132_2$ in forearm 22, and path segments $134_1$ and $134_2$ in the respective hands $30_1$ and $30_2$ are either channels formed by complementary depressions in mating components or holes passing through solid components.

Figure 9B:
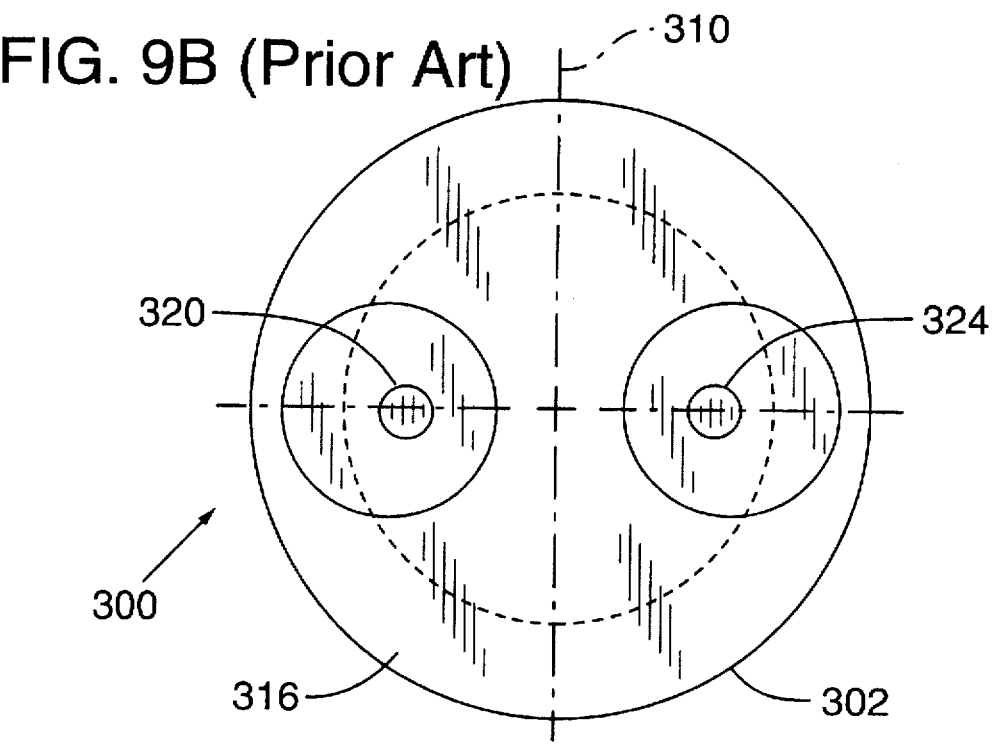
FIGS. 9A and 9B are respective side elevation and plan views of the rotary multiple fluid-passageway spool installed in each rotary joint of the robot arm system of FIGS. 8A and 8B.
Figure 9A:
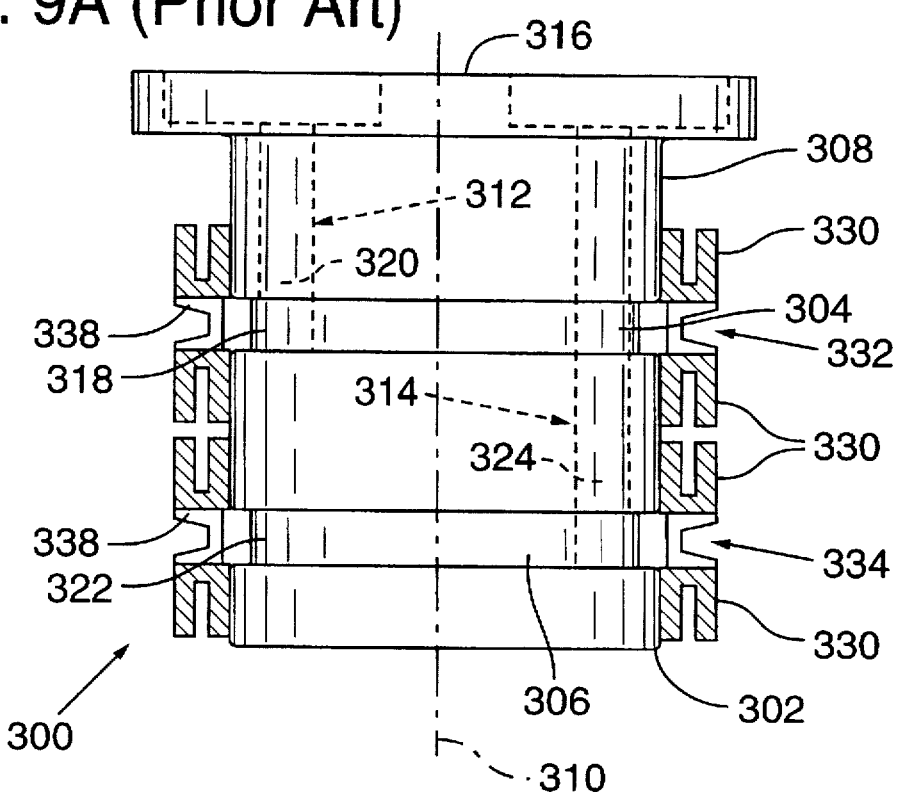

Outlets $36_1$ and $36_2$ constitute holes in the respective vacuum lands $126_1$ and $126_2$. Each path segment of conduits $124_1$ and $124_2$ terminating or originating at central axis 13, shoulder axis 16, elbow axis 24, and wrist axis 32 includes a rotary multiple fluid-passageway spool 300 that functions as two independent vacuum feedthrough conduits that permit continuous rotation about any one of these four axes. The placement of spool 300 fitted in each of the three rotary joints of robot arm mechanism 210 is shown in FIGS. 8A and 8B. FIGS. 9A and 9B show the design detail of a prior art rotary multiple fluid-passageway spool 300.

With reference to FIGS. 8A, 8B, 9A, and 9B, spool 300 comprises a solid metal cylindrical body 302 having two spaced-apart grooves 304 and 306 formed in and encircling its outer side surface 308 about a longitudinal axis 310. Two separate vacuum pressure delivery channels 312 and 314 are formed within and pass through body 302. (Comparison of FIGS. 8A and 8B with FIG. 9B reveals that vacuum pressure delivery channels 312 and 314 formed within body 302 by artistic license are drawn rotated by 90 degrees in FIG. 8A only to show clearly the vacuum pressure conduits.) Each of channels 312 and 314 has two passageway segments, one originating in a groove and the other terminating at a top surface 316 of body 302. More specifically, for channel 312, a passageway segment 318 extends inwardly from groove 304 in a direction transverse to longitudinal axis 310 and intersects with a passageway segment 320 at a right angle juncture. Passageway segment 320 extends upwardly toward and through top surface 316 in a direction parallel to longitudinal axis 310. Similarly, for channel 314, a passageway segment 322 extends inwardly from groove 306 in a direction transverse to longitudinal axis 310 and intersects with a passageway segment 324 at a right angle juncture. Passageway segment 324 extends upwardly toward and through top surface 316 in a direction parallel to longitudinal axis 310.

For purposes of convenience only, the following describes the operation of spool 300 in the rotary joint defining wrist 32. When spool 300 is fitted into forearm 22, four seal rings 330 spaced above, between (two seals), and below grooves 304 and 306 form two annular gas spaces 332 and 334 between side surface 308 of spool 300 and an interior surface 338 of forearm 22. Spacers 366 that extend about 330 degrees around spool 300 in grooves 304 and 306 maintain the desired separation between adjacent seal rings 330. Vacuum path segments $134_1$ and $134_2$ terminate in the respective gas spaces 332 and 334 and their corresponding holes in top surface 316 of spool 300, thereby coupling the vacuum pressure supply to and from spool 300.

Figure 10:
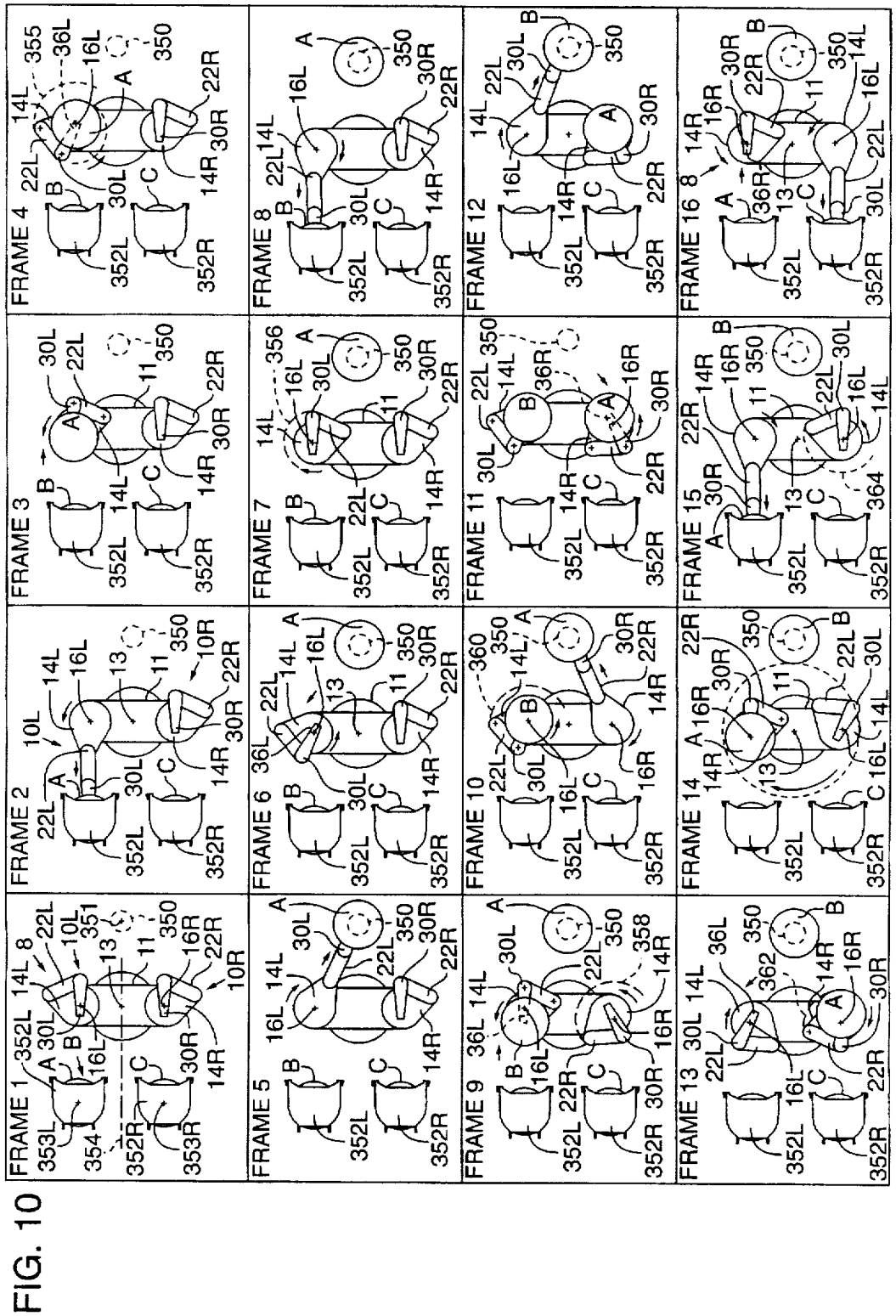
FIG. 10 shows in a series of 16 frames the various positions of the two-arm, multiple link robot arm system of FIGS. 1A, 1B, and 1C as it retrieves two specimens from two parallel-aligned storage locations and sequentially places the two specimens temporarily at a process location.

FIG. 10 includes 16 frames showing various positions of robot arm mechanisms 10L and 10R of robot arm system 8 in an exemplary operational sequence that moves a wafer A from a left-side wafer cassette 352L to a processing station 350 (such as a cooling platform) and back to left wafer cassette 352L, moves a wafer B from left wafer cassette 352L to processing station 350, and retrieves a wafer C from a right-side wafer cassette 352R.

In this example, in the initial position shown in frame 1, left shoulder axis 16L is radially positioned 40.0 centimeters (15.8 inches) from an effective center 351 of processing station 350 and an effective center 353L of cassette 352L. Right shoulder axis 16R is radially positioned 40.0 centimeters (15.8 inches) from center 351 of processing station 350 and an effective center 353R of cassette 352R. Axes 16L and 16R and centers 353L and 353R define four corners of a rectangle with axes 16L and 16R being spaced apart a distance of 35.5 centimeters (14.0 inches) and cassettes 352L and 352R being spaced apart a distance of 35.5 centimeters (14.0 inches) from center to center. Cassettes 352L and 352R are spaced apart from respective axes 16R and 16L a non-radial distance of 53.5 centimeters (21.1 inches) measured along the respective diagonals of the rectangle. Torso movement rotation of shoulders 14L and 14R, as shown in frame 14, radially positions axes 16L and 16R a distance of 40.0 centimeters (15.8 inches) from effective centers 353R and 353L.

The following description tracks the angular displacement of torso link 11 about central axis 13, upper arm 14R about shoulder axis 16R, and upper arm 14L about shoulder axis 16L to demonstrate the continuous rotation capabilities of torso link 11 and the mechanical links in robot arm mechanisms 10R and 10L.

Frame 1 shows the initial positions of hands 30L and 30R retracted and in line with the openings of the respective cassettes 352L and 352R. In these initial positions, the central longitudinal axis of upper arm 14L (i.e., a line connecting axes 16L and 24L) is angularly displaced 67.5 degrees in a 427counter-clockwise direction from a reference line 354, and the central longitudinal axis of upper arm 14R (i.e., a line connecting axes 16R and 24R) is angularly displaced 67.5 degrees in a clockwise direction from reference line 354. Reference line 354 is perpendicular to a line connecting centers 353L and 353R.

Frame 2 shows upper arm 14L and forearm 22L cooperatively rotating in the first operational state of motor controller 54 to linearly extend hand 30L so as to reach and retrieve wafer A from cassette 352L. To accomplish this incremental movement, upper arm 14L rotated 112.5 degrees in a counter-clockwise direction about shoulder axis 16L.

Frame 3 shows upper arm 14L and forearm 22L cooperatively rotating in the first operational state of motor controller 54 to linearly retract hand 30L holding wafer A after the application of vacuum pressure at outlet 36L to secure wafer A to hand 30L. To accomplish this incremental movement, upper arm 14L rotated 112.5 degrees in a counter-clockwise direction about shoulder axis 16L.

Frame 4 shows upper arm 14L rotating 153.65 degrees in a counter-clockwise direction along a circular path segment 355 about shoulder axis 16L in the second operational state of motor controller 54 to keep hand 30L retracted while holding wafer A, hold forearm 22L stationary, and position hand 30L in line with processing station 350. Upon completion of this incremental movement, upper arm 14L exceeded a continuous 360 degree cycle of counter-clockwise rotation.

Frame 5 shows upper arm 14L and forearm 22L cooperatively rotating in the first operational state of controller 54 to linearly extend hand 30L so as to reach and place wafer A on processing station 350. To accomplish this incremental movement, upper arm 14L rotated 112.5 degrees in a clockwise direction about shoulder axis 16L.

Frame 6 shows upper arm 14L and forearm 22L cooperatively rotating in the first operational state of controller 54 to linearly retract hand 30L after the release of vacuum pressure at outlet 36L to leave wafer A at processing station 350. To accomplish this incremental movement, upper arm 14L rotated 112.5 degrees in a counter-clockwise direction about shoulder axis 16L.

Frame 7 shows upper arm 14L rotating 153.65 degrees in a clockwise direction along a circular path segment 356 about shoulder axis 16L in the second operational state of controller 54 to keep hand 30L retracted, hold forearm 22L stationary, and position hand 30L in line with cassette 352L.

Frame 8 shows upper arm 14L and forearm 22L cooperatively rotating in the first operational state of controller 54 to linearly extend hand 30L to retrieve wafer B from cassette 352L. To accomplish this incremental movement, upper arm 14L rotated 112.5 degrees in a clockwise direction about shoulder axis 16L.

Frame 9 shows simultaneous rotation of upper arms 14L and 14R. Upper arm 14L and forearm 22L cooperatively rotate in the first operational state of controller 54 to linearly retract hand 30L holding wafer B after the application of vacuum pressure at outlet 36L to secure wafer B to hand 30L. To accomplish this incremental movement, upper arm 14L rotated 112.5 degrees in a counter-clockwise direction about shoulder axis 16L. Upper arm 14R rotates 206.36 degrees in a counter-clockwise direction along a circular path segment 358 about shoulder axis 16R in the second operational state of controller 54 to keep hand 30R retracted, hold forearm 22R stationary, and position hand 30R in line with processing station 350.

Frame 10 shows simultaneous rotation of upper arms 14L and 14R. Upper arm 14L rotates 153.65 degrees in a counter-clockwise direction along a circular path segment 360 about shoulder axis 16L in the second operational state of controller 54 to keep hand 30L retracted while holding wafer B, hold forearm 22L stationary, and position hand 30L in line with processing station 350. Upper arm 14R and forearm 22R cooperatively rotate in the first operational state of motor controller 54 to linearly extend hand 30R so as to reach and retrieve wafer A from processing station 350. To accomplish this incremental movement, upper arm 14R rotated 112.5 degrees in a clockwise direction about shoulder axis 16R.

Frame 11 shows upper arm 14R and forearm 22R cooperatively rotating in the first operational state of controller 54 to linearly retract hand 30R holding wafer A after the application of vacuum pressure at outlet 36R to secure wafer A to hand 30R. To accomplish this incremental movement, upper arm 14R rotated 112.5 degrees in a counter-clockwise direction about shoulder axis 16R.

Frame 12 shows upper arm 14L and forearm 22L cooperatively rotating in the first operational state of motor controller 54 to linearly extend hand 30L so as to reach and place wafer B on processing station 350. To accomplish this incremental movement, upper arm 14L rotated 112.5 degrees in a clockwise direction about shoulder axis 16L.

Frame 13 shows simultaneous rotation of upper arms 14L and 14R. Upper arm 14L and forearm 22L cooperatively rotate in the first operational state of controller 54 to linearly retract hand 30L after the release of vacuum pressure at outlet 36L to leave wafer B at processing station 350. To accomplish this incremental movement, upper arm 14L rotated 112.5 degrees in a clockwise direction about shoulder axis 16L. Upper arm 14R rotates 26.35 degrees in a clockwise direction along a circular path segment 362 about shoulder axis 16R in the second operational state of controller 54 to keep hand 30R retracted while holding wafer A, hold forearm 22R stationary, and position hand 30R in line with, but facing a direction opposite from, cassette 352R.

Frame 14 shows torso link 11 rotating 180 degrees in a clockwise (or counter-clockwise) direction about central axis 13 to position hand 30L adjacent cassette 352R and hand 30R in line with cassette 352L.

Frame 15 shows simultaneous rotation of upper arms 14L and 14R. Upper arm 14R and forearm 22R cooperatively rotate in the first operational state of motor controller 54 to linearly extend hand 30R so as to reach and place wafer A in cassette 352L. To accomplish this incremental movement, upper arm 14R rotated 112.5 degrees in a clockwise direction about shoulder axis 16R. Upper arm 14L rotates 26.35 degrees in a counter-clockwise direction along a circular path segment 364 about shoulder axis 16L in the second operational state of controller 54 to keep hand 30L retracted, hold forearm 22L stationary, and position hand 30L in line with cassette 352R.

Frame 16 shows simultaneous rotation of upper arms 14L and 14R. Upper arm 14R and forearm 22R cooperatively rotate in the first operational state of controller 54 to linearly retract hand 30R after the release of vacuum pressure at outlet 36R to leave wafer A in cassette 352L. To accomplish this incremental movement, upper arm 14R rotated 112.5 degrees in a counter-clockwise direction about shoulder axis 16R. Upper arm 14L and forearm 22L cooperatively rotate in the first operational state of motor controller 54 to linearly extend hand 30L so as to reach and retrieve wafer C from cassette 352R. To accomplish this incremental movement, upper arm 14L rotated 112.5 degrees in a counter-clockwise direction about shoulder axis 16L.

In this example, upper arm 14L underwent bi-directional rotational movement and completed a continuous 378.65 degree cycle in a counter-clockwise direction about shoulder axis 16L before any clockwise counter-rotation. Torso link 11 underwent rotational movement and completed a continuous 180 degree cycle about central axis 13 without any counter-rotation. This example demonstrates an ability to make quick exchanges between stations in a layout with a reduced footprint. As a numerical example, because of its ability to collapse its arm links, a 21-inch (53 centimeters) diameter robot can manipulate two 12-inch (30.5 centimeters) wafers. Robot arm system 8 is also capable of moving hands 30L and 30R simultaneously to increase throughput.

Figure 11:
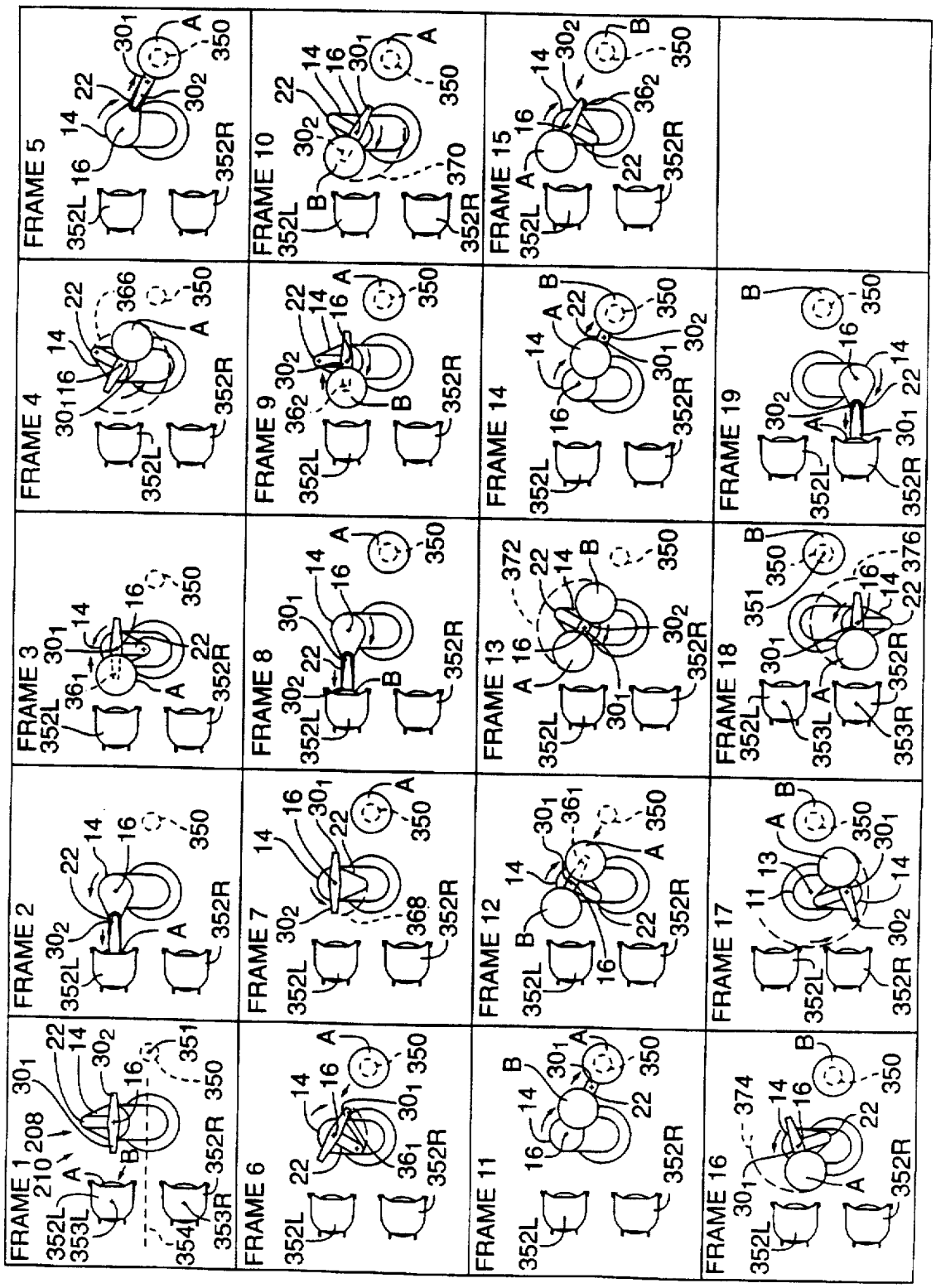
FIG. 11 shows in a series of 19 frames the various positions of a one-arm, two-hand multiple link robot arm system of FIGS. 7A and 7B as it retrieves two specimens from parallel-aligned storage locations and sequentially places the two specimens temporarily at a process location.

FIG. 11 includes 19 frames showing various positions of robot arm mechanism 210 of robot arm system 208 in an exemplary operational sequence that moves a wafer A from wafer cassette 352L to processing station 350 and to wafer cassette 352R, and moves a wafer B from wafer cassette 352L to processing station 350.

In this example, in the initial position shown in frame 1, shoulder axis 16 is radially positioned 40.0 centimeters (15.8 inches) from an effective center 351 of processing station 350 and an effective center 353L of cassette 352L. As shown in frame 18, shoulder axis 16 is radially positioned 40.0 centimeters (15.8 inches) from center 351 of processing station 350 and an effective center 353R of cassette 352R. The position of axis 16 in frame 1, the position of axis 16 in frame 18, and centers 353L and 353R define four corners of a rectangle with axes 16 (frame 1) and 16 (frame 18) being spaced apart by a distance of 35.5 centimeters (14.0 inches) and cassettes 352L and 352R being spaced apart by a distance of 35.5 centimeters (14.0 inches) from center to center. Cassettes 352L and 353R are spaced from respective axes 16 (frame 18) and 16 (frame 1) a non-radial distance of 53.5 centimeters (21.1 inches) measured along the respective diagonals of the rectangle. Torso movement rotation of shoulder 14, as shown in frame 17, radially positions axes 16 (frame 1) and 16 (frame 18) a distance of 40.0 centimeters (15.8 inches) from respective centers 353R and 353L.

The following description tracks the angular displacement of torso link 11 about central axis 13, upper arm 14 about shoulder axis 16, and hands $30_1$ and $30_2$ of end effector 230 about wrist axis 32 to demonstrate the continuous rotation capabilities of torso link 11 and the mechanical links in robot arm mechanism 210.

Frame 1 shows the initial positions of hands $30_1$ and $30_2$ retracted and in line with the opening of cassette 352L, with hand $30_1$ facing in the direction of and nearer than hand $30_2$ to cassette 352L. In these initial positions, the central longitudinal axis of upper arm 14 (i.e., a line connecting axes 16 and 24) is angularly displaced 90.00 degrees in a counter-clockwise direction from a reference line 354. Reference line 354 is perpendicular to a line connecting centers 353L and 353R.

Frame 2 shows upper arm 14 and forearm 22 cooperatively rotating in the first operational state of motor controller 54 to linearly extend hand $30_1$ so as to reach and retrieve wafer A from cassette 352L. To accomplish this incremental movement, upper arm 14 rotated 90.0 degrees in a counter-clockwise direction about shoulder axis 16.

Frame 3 shows upper arm 14 and forearm 22 cooperatively rotating in the first operational state of motor controller 54 to linearly retract hand $30_1$ holding wafer A after the application of vacuum pressure at outlet $36_1$ to secure wafer A to hand $30_1$. To accomplish this incremental movement, upper arm 14 rotated 90.00 degrees in a counter-clockwise direction about shoulder axis 16.

Frame 4 shows upper arm 14 rotating 153.65 degrees in a counter-clockwise direction along a circular path segment 366 about shoulder axis 16 in the second operational state of motor controller 54 to keep hand $30_1$ retracted while holding wafer A, hold forearm 22 stationary, and position hand $30_1$ in line with processing station 350.

Frame 5 shows upper arm 14 and forearm 22 cooperatively rotating in the first operational state of controller 54 to linearly extend hand $30_1$ so as to reach and place wafer A on processing station 350. To accomplish this incremental movement, upper arm 14 rotated 90.0 degrees in a clockwise direction about shoulder axis 16.

Frame 6 shows upper arm 14 and forearm 22 cooperatively rotating in the first operational state of controller 54 to linearly retract hand $30_1$ after the release of vacuum pressure at outlet $36_1$ to leave wafer A at processing station 350. To accomplish this incremental movement, upper arm 14 rotated 90.00 degrees in a clockwise direction about shoulder axis 16.

Frame 7 shows upper arm 14 rotating 26.35 degrees in a counter-clockwise direction along a circular path segment 368 about shoulder axis 16 in the second operational state of controller 54 to keep hand $30_2$ retracted, hold forearm 22 stationary, and position hand $30_2$ in line with cassette 352L.

Frame 8 shows upper arm 14 and forearm 22 cooperatively rotating in the first operational state of controller 54 to linearly extend hand $30_2$ to retrieve wafer B from cassette 352L. To accomplish this incremental movement, upper arm 14 rotated 90.00 degrees in a clockwise direction about shoulder axis 16.

Frame 9 shows upper arm 14 and forearm 22 cooperatively rotating in the first operational state of controller 54 to linearly retract hand $30_2$ holding wafer B after the application of vacuum pressure at outlet $36_2$ to secure wafer B to hand $30_2$. To accomplish this incremental movement, upper arm 14 rotated 90.00 degrees in a clockwise direction about shoulder axis 16.

Frame 10 shows upper arm 14 rotating 26.35 degrees in a clockwise direction along a circular path segment 370 about shoulder axis 16 in the second operational state of controller 54 to keep hand $30_2$ retracted while holding wafer B, hold forearm 22 stationary, and position hand $30_1$ in line with and nearer than hand $30_2$ to processing station 350.

Frame 11 shows upper arm 14 and forearm 22 cooperatively rotating in the first operational state of controller 54 to linearly extend hand $30_1$ so as to reach and retrieve wafer A from processing station 350. To accomplish this incremental movement, upper arm 14 rotated 90.00 degrees in a clockwise direction about shoulder axis 16.

Frame 12 shows upper arm 14 and forearm 22 cooperatively rotating in the first operational state of motor controller 54 to linearly retract hand $30_1$ holding wafer A after the application of vacuum pressure at outlet $36_1$ to secure wafer A to hand $30_1$. To accomplish this incremental movement, upper arm 14 rotated 90.00 degrees in a clockwise direction about shoulder axis 16.

Frame 13 shows upper arm 14 rotating 180.00 degrees in a clockwise (or counter-clockwise) direction along a circular path segment 372 about shoulder axis 16 in the second operational state of motor controller 54 to keep hand $30_1$ retracted while holding wafer A, hold forearm 22 stationary, and position hand $30_2$ in line with processing station 350.

Frame 14 shows upper arm 14 and forearm 22 cooperatively rotating in the first operational state of controller 54 to linearly extend hand $30_2$ so as to reach and place wafer B on processing station 350. To accomplish this incremental movement, upper arm 14 rotated 90.00 degrees in a clockwise direction about shoulder axis 16.

Frame 15 shows upper arm 14 and forearm 22 cooperatively rotating in the first operational state of controller 54 to linearly retract hand $30_2$ after the release of vacuum pressure at outlet $36_2$ to leave wafer B at processing station 350. To accomplish this incremental movement, upper arm 14 rotated 90.00 degrees in a clockwise direction about shoulder axis 16. Upon completion of the incremental movements shown in frames 8–15, upper arm 14 underwent a continuous 746.35 degree cycle of clockwise rotation without any counter-rotation.

Frame 16 shows upper arm 14 rotating 45.00 degrees in a counter-clockwise direction along a circular path 374 about shoulder axis 16 in the second operational state of controller 54 to keep hand $30_1$ retracted while holding wafer A and hold forearm 22 stationary.

Frame 17 shows torso link 11 rotating 180 degrees in a clockwise (or counter-clockwise) direction about central axis 13 to position hand $30_2$ adjacent cassette 352R and hand $30_1$ adjacent, but facing a direction opposite from, cassette 352R.

Frame 18 shows upper arm 14 rotating 161.35 degrees in a counter-clockwise direction along a circular path 376 about shoulder axis 16 in the second operational state of controller 54 to keep hand $30_1$ retracted, hold forearm 22 stationary, and position hand $30_1$ in line with cassette 352R.

Frame 19 shows upper arm 14 and forearm 22 cooperatively rotating in the first operational state of motor controller 54 to linearly extend hand $30_1$ so as to reach and place wafer A in cassette 352R. To accomplish this incremental movement, upper arm 14 rotated 90.00 degrees in a clockwise direction about shoulder axis 16.

In this example, upper arm 14 underwent bi-directional rotational movement and completed a continuous 746.35 degree cycle in a clockwise direction about shoulder axis 16 without any counter-clockwise rotation. Torso link 11 underwent rotational movement and completed a continuous 180 degree cycle about central axis 11 without any counter-rotation.

Robot arm systems 8 and 208 provide different benefits, depending on the application. Robot arm 208 is more cost effective because it requires fewer parts to rotate the robot arm links around four axes, as compared with the six axes of robot arm system 8. Robot arm system 208 is faster and more compact for transporting large specimens because robot arm mechanism 210 requires less working space to sweep the specimen about the central axis. As a consequence, robot arm system 208 is more amenable to complex path planning. On the other hand, robot arm system 8 is easier to "teach" to perform the necessary hand movement to accomplish the exchange functions desired.

Robot arm systems 8 and 208 provide extended reach in that all links can be serially extended. To match the same length of extension, a conventional three-link robot arm mechanism would require a much greater footprint because of a limited ability to collapse its length. Moreover, there are geometrical limits to a reacharound capability with conventional three-link robot arm mechanisms, which perform linear moves by following a path defined by the radial line connecting the shoulder axis to the end of the hand. The present invention described above is capable of performing linear moves without following a radial path.

It will be obvious to those having skill in the art that many changes may be made to the details of the above-described embodiments of this invention without departing from the underlying principles thereof. For example, robot arm mechanism 210 can be modified by removing one of the hands of end effector structure 230 to provide a one arm, one hand robot system having long reach and reacharound capabilities. The scope of the present invention should, therefore, be determined only by the following claims.

We claim:

1. A robot arm system having two multiple-link robot arm mechanisms with corner reacharound capabilities, comprising:

a torso link operable for rotation about a central axis and on which first and second robot arm mechanisms are mounted for rotation about respective first and second shoulder axes that are spaced apart from each other and offset from the central axis;

the first robot arm mechanism comprising a first upper arm supporting a first forearm and a first hand and operable for rotation about the first shoulder axis, the first forearm having a first upper arm end that is supported by the first upper arm for rotation about a first elbow axis and having a first hand end that supports the first hand for rotation about a first wrist axis;

a first pair of arm mechanism motors functioning in cooperation to control the motion of the first robot arm mechanism;

a first mechanical linkage operatively connecting the first upper arm, the first forearm, and the first hand so that the first hand is positionable to selected locations in response to controlled angular displacements of the first pair of arm mechanism motors;

the second robot arm mechanism comprising a second upper arm supporting a second forearm and a second hand and operable for rotation about the second shoulder axis, the second forearm having a second upper arm end that is supported by the second upper arm for rotation about a second elbow axis and having a second hand end that supports the second hand for rotation about a second wrist axis;

a second pair of arm mechanism motors functioning in cooperation to control the motion of the second robot arm mechanism;

a second mechanical linkage operatively connecting the second upper arm, the second forearm, and the second hand so that the second hand is positionable to selected locations in response to controlled angular displacements of the second pair of arm mechanism motors;

a torso link motor for rotatably positioning the torso link about the central axis; and a controller coordinating the operation of the first pair of arm mechanism motors so that the first mechanical linkage causes linear displacement of the first hand without constraint that it cross the central axis and causes angular displacement of the first hand about the first shoulder axis, coordinating the operation of the second pair of arm displacement motors so that the second mechanical linkage causes linear displacement of the second hand without constraint that it cross the central axis and causes angular displacement of the second hand about the second shoulder axis, and controlling the angular displacement of the torso link motor to control the angular positions of the first and second shoulder axes and thereby the angular positions of the first and second hands about the central axis.

2. The robot arm system of claim 1 in which the first pair of arm mechanism motors includes first and second motors and the controller coordinates the operation of the first and second motors in first and second states, the controller in the second state coordinating the operation of the first and second motors to provide essentially equal and opposite offsetting angular displacements of the first upper arm about the first shoulder axis and the first forearm about the first elbow axis to cause angular displacement of the first hand about the first shoulder axis but essentially no angular displacement of the first hand about the first wrist axis.

3. The robot arm system of claim 2 in which the first and second motors rotate in the same direction.

4. The robot arm system of claim 1 in which the first pair of arm mechanism motors includes first and second motors and the controller coordinates the operation of the first and second motors in first and second states, the controller in the second state coordinating the operation of the first and second motors to provide dissimilar angular displacements of the first upper arm about the first shoulder axis and of the first forearm about the first elbow axis to cause angular displacements of the first hand about the first shoulder and first wrist axes and thereby describe a nonradial, straight line path of travel for the first hand.

5. The robot arm system of claim 1 in which the first pair of arm mechanism motors includes first and second motors and the controller coordinates the operation of the first and second motors in first and second states, the controller in the first state causing a change in the linear extension of the first hand by actuating the second motor to rotate the first upper arm and thereby impart rotational motion to the first forearm about the first elbow axis and to the first hand about the first wrist axis to effect a straight line movement of the first hand and in the second state causing angular displacement of the first hand about the first shoulder axis by actuating the second motor to rotate the first upper arm and the first motor to rotate the first forearm about the first elbow axis so that the straight line movement imparted to the first hand by the rotation of the first upper arm is at least partly offset by straight line movement imparted to the first hand by the rotation of the first forearm.

6. The robot arm system of claim 5 in which the first and second motors are coordinated to move in equal amounts so that the linear motions imparted to the first hand by the rotations of the first upper arm and the first forearm are essentially completely offset.

7. The robot arm system of claim 1 in which the central axis, first shoulder axis, and second shoulder axis lie in the same plane.

8. The robot arm system of claim 1 in which the torso link is an elongate element that has opposite ends and the first and second robot arm mechanisms are positioned near the opposite ends of the torso link.

9. The robot arm system of claim 1 in which each of the first and second pairs of arm mechanism motors includes a first motor having a first spindle and a second motor having a second spindle and in which the first and second motors of each of the first and second pairs of arm mechanism motors are positioned in concentric relation such that their respective first and second spindles rotate about a common axis.

10. The robot arm system of claim 9 in which the common axis for the first pair of arm mechanism motors constitutes the first shoulder axis and for the second pair of arm mechanism motors constitutes the second shoulder axis.

11. The robot arm system of claim 1 in which the first pair of arm mechanism motors includes first and second motors and in which the second motor includes a second spindle and is positioned so that the second spindle rotates about the first shoulder axis, the second spindle being directly mechanically connected to the first upper arm.

12. A multiple link robot arm system having corner reacharound capabilities, comprising:
- a robot arm mechanism comprising an upper arm supporting a forearm and a hand and operable for rotation about a shoulder axis, the forearm having a first end that is supported by the upper arm for rotation about an elbow axis and having a second end that supports a hand for rotation about a wrist axis;
- the upper arm, forearm, and hand constitute link elements through which a fluid pressure conduit passes to deliver vacuum pressure to releasably secure a specimen to the hand; the shoulder axis, elbow axis, and wrist axis define rotary joints through which the fluid pressure conduit passes; and at least one of the rotary joints is fitted with a rotary fluid slip ring that has a central aperture through which vacuum pressure is delivered and that has first and second surfaces which form a vacuum pressure seal at an interface between the link elements forming the rotary joint into which the slip ring is fitted;
- a first motor for rotatably positioning the forearm about the elbow axis;
- a second motor for rotatably positioning the upper arm about the shoulder axis;
- a mechanical linkage operatively connecting the upper arm and the forearm, the mechanical linkage forming an active drive link between the first motor and the forearm to cause the forearm to rotate about the elbow axis in response to operation of the first motor and a passive drive link between the forearm and the hand to cause the hand to rotate about the wrist axis in response to rotation of the forearm about the elbow axis;
- a torso link supporting the upper arm and operable for rotation about a central axis;
- a third motor for rotatably positioning the torso link about the central axis; and a controller coordinating the operation of the first and second motors in first and second states and controlling the angular displacement of the third motor, the first state characterized by operating the second motor and holding stationary the first motor so that the mechanical linkage causes linear displacement of the hand and the second state characterized by operating the first and second motors so that the mechanical linkage causes angular displacement of the hand about the shoulder axis, and the angular displacement of the third motor controlling the angular position of the hand about the central axis.

13. A multiple link robot arm system having corner reacharound capabilities, comprising:
- an upper arm supporting a forearm and a hand and operable for rotation about a shoulder axis, the forearm having a first end that is supported by the upper arm for rotation about an elbow axis and having a second end that supports the hand for rotation about a wrist axis, and the shoulder axis, elbow axis, and wrist axis defining rotary joints for, respectively, the upper arm, the upper arm and forearm, and the forearm and hand;
- a fluid pressure conduit passing through the upper arm, forearm, and hand to deliver vacuum pressure to releasably secure a specimen to the hand;
- a first motor including a first spindle for rotatably positioning the forearm about the elbow axis and a second motor including a second spindle for rotatably positioning the upper arm about the shoulder axis, the first and second motors being positioned in concentric relation such that their respective first and second spindles rotate about a common axis;
- a mechanical linkage operatively connecting the upper arm and the forearm, the mechanical linkage forming an active drive link between the first motor and the forearm to cause the forearm to rotate about the elbow axis in response to operation of the first motor and a passive drive link between the forearm and the hand to cause the hand to rotate about the wrist axis in response to rotation of the forearm about the elbow axis;
- a rotary fluid slip ring fitted within the rotary joint defined by the elbow axis, the slip ring having a central aperture through which vacuum pressure is delivered and first and second surfaces that form a vacuum pressure seal between the upper arm and the forearm;
- a torso link supporting the upper arm and operable for rotation about a central axis;
- a third motor for rotatably positioning the torso link about the central axis; and
- a controller coordinating the operation of the first and second motors so that the mechanical linkage causes linear displacement of the hand and angular displacement of the hand about the shoulder axis, and the controller controlling the angular displacement of the third motor so that the torso link rotates about the central axis to control the angular position of the end effector structure about the central axis.

14. The robot arm system of claim 13 in which the common axis constitutes the shoulder axis.

15. The robot arm system of claim 13 in which the second spindle is directly mechanically connected to the upper arm.

16. The robot arm system of claim 13 in which the hand comprises one of two oppositely extending hands of an end effector structure that is operable for rotation about the wrist axis.

17. The robot arm system of claim 13 in which the upper arm is operatively connected to a base housing through which the shoulder axis passes and further comprising two additional rotary fluid slip rings, one of the two rotary fluid slip rings fitted within the rotary joint defined by the shoulder axis to form a vacuum seal between the base housing and the upper arm and the other rotary fluid slip ring fitted within the rotary joint defined by the wrist axis to form a vacuum seal between the forearm and the hand.

* * * * *

UNITED STATES PATENT AND TRADEMARK OFFICE
CERTIFICATE OF CORRECTION

PATENT NO. : 5,765,444

DATED : June 16, 1998

INVENTOR(S) : PAUL BACCHI and PAUL S. FILIPSKI

It is certified that error appears in the above-indentified patent and that said Letters Patent is hereby corrected as shown below:

Column 9, line 11, in equation (1), change "$r_2$" to --$r^2$--.

Column 9, line 17, change "$\Theta_{S=\Theta SR}$" to --$\Theta_S = \Theta_{SR}$--.

Column 10, line 10, change "168$_\lambda$" to --168$\ell$--.

Column 10, line 11, change "172$_\lambda$" to --172$\ell$--.

Column 10, line 11, change "170$_\lambda$" to --170$\ell$--.

Column 10, line 13, change "168$_\lambda$" to --168$\ell$--.

Column 11, line 11, change "8A-2 to --8A-2 (collectively, "Fig. 8A") and--.

Column 20, line 8, claim 12, "the central axis; and a controller" should be reformatted to read
  --the central axis; and
  a controller--.

Signed and Sealed this

Eighteenth Day of January, 2000

Attest:

Q. TODD DICKINSON

*Attesting Officer*  *Commissioner of Patents and Trademarks*